(12) United States Patent
Eshleman et al.

(10) Patent No.: US 8,418,778 B2
(45) Date of Patent: *Apr. 16, 2013

(54) POWER SCREWDRIVER HAVING ROTARY INPUT CONTROL

(75) Inventors: Scott Eshleman, Parkville, MD (US); Craig Schell, Street, MD (US); Andrew E. Seman, Pylesville, MD (US); Daniel Puzio, Baltimore, MD (US); Daniele C. Brotto, Baltimore, MD (US); Joseph P. Kelleher, Parkville, MD (US); Christopher W. Shook, Bel Air, MD (US); Steven J. Phillips, Ellicott City, MD (US); Dale W. Boswall, Brockville, CA (US); James B. Watson, Baltimore, MD (US); Fugen Qin, Timonium, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/404,620

(22) Filed: Feb. 24, 2012

(65) Prior Publication Data
US 2012/0160529 A1 Jun. 28, 2012

Related U.S. Application Data

(63) Continuation-in-part of application No. 13/120,873, filed as application No. PCT/US2011/020511 on Jan. 7, 2011, now Pat. No. 8,286,723.

(60) Provisional application No. 61/292,966, filed on Jan. 7, 2010, provisional application No. 61/389,866, filed on Oct. 5, 2010.

(51) Int. Cl.
*E21B 15/04* (2006.01)

(52) U.S. Cl.
USPC .................. 173/1; 173/2; 173/176; 173/183; 173/217

(58) Field of Classification Search .................. 173/1, 2, 173/4, 176, 178, 181, 183, 216, 217
See application file for complete search history.

(56) References Cited

U.S. PATENT DOCUMENTS 1,990,035 A  2/1935  Kratz et al.
2,617,971 A  11/1952  Stack
(Continued)

FOREIGN PATENT DOCUMENTS

DE  2442260  3/1976
DE  3108112  9/1982
(Continued)

OTHER PUBLICATIONS

Design of All-Accelerometer Inertial Measurement Unit for Tremor Sensing in Hand-Held Microsurgical Instrument by the Robotics Institute, Carnegie Mellon University, Pittsburgh, PA 15213 (6 pages); 2003.

(Continued)

*Primary Examiner* — Scott A. Smith
(74) *Attorney, Agent, or Firm* — Harness, Dickey & Pierce, P.L.C.

(57) ABSTRACT

An improved method is provided for operating a power tool. The method includes: monitoring rotational motion of the power tool about an axis using a rotational motion sensor disposed in the power tool; determining a direction of the rotational motion about the axis; and driving the output member in a direction defined by the detected rotational motion of the tool, where the output member is driven by a motor residing in the power tool. Thus, the output member is drive clockwise when the rotational motion of the tool is clockwise about the axis and the output member is drive counter-clockwise when the rotational motion of the tool is counter-clockwise about the axis.

19 Claims, 22 Drawing Sheets

U.S. PATENT DOCUMENTS

| | | |
|---|---|---|
| 2,776,653 A | 1/1957 | Eaton |
| 3,083,508 A | 4/1963 | Fegley et al. |
| 3,463,990 A | 8/1969 | Ross |
| 3,554,302 A | 1/1971 | Adkins et al. |
| 3,616,864 A | 11/1971 | Sorensen |
| 3,773,117 A | 11/1973 | Dussel |
| 3,847,229 A | 11/1974 | Wanner et al. |
| 3,939,920 A | 2/1976 | Hardiman et al. |
| 3,963,364 A | 6/1976 | Lemelson |
| 4,060,115 A | 11/1977 | Bocanegra Marquina |
| 4,066,133 A | 1/1978 | Voss |
| 4,095,547 A | 6/1978 | Benington |
| 4,104,778 A | 8/1978 | Vliet |
| 4,143,467 A | 3/1979 | Erspamer et al. |
| 4,249,117 A | 2/1981 | Leukhardt et al. |
| 4,262,528 A | 4/1981 | Holting et al. |
| 4,267,914 A | 5/1981 | Saar |
| 4,305,471 A | 12/1981 | Eshghy |
| 4,418,765 A | 12/1983 | Mori et al. |
| 4,426,588 A | 1/1984 | Weilnmann |
| 4,448,261 A | 5/1984 | Kousek et al. |
| 4,487,270 A | 12/1984 | Huber |
| 4,510,802 A | 4/1985 | Peters |
| D279,254 S | 6/1985 | Smith et al. |
| 4,573,556 A | 3/1986 | Andreasson |
| 4,576,270 A | 3/1986 | Baltz et al. |
| 4,587,468 A | 5/1986 | Hotta |
| 4,601,206 A | 7/1986 | Watson |
| 4,628,233 A | 12/1986 | Bradus |
| 4,638,870 A | 1/1987 | Kousek |
| 4,648,282 A | 3/1987 | Alender et al. |
| 4,732,221 A | 3/1988 | Dudek |
| 4,744,248 A | 5/1988 | Stewart |
| 4,754,669 A | 7/1988 | Verdier et al. |
| 4,759,225 A | 7/1988 | Reynertson et al. |
| 4,793,226 A | 12/1988 | Kress |
| 4,820,962 A | 4/1989 | Millauer et al. |
| 4,841,773 A | 6/1989 | Stewart |
| 4,846,027 A | 7/1989 | Lu |
| 4,871,033 A | 10/1989 | Odoni et al. |
| 4,878,404 A | 11/1989 | Liao |
| 4,885,511 A | 12/1989 | Millauer et al. |
| 4,948,164 A | 8/1990 | Hano et al. |
| RE33,379 E | 10/1990 | Bradus |
| 4,961,035 A | 10/1990 | Inaba et al. |
| 4,996,877 A | 3/1991 | Stewart et al. |
| 5,014,793 A | 5/1991 | Germanton et al. |
| 5,015,793 A | 5/1991 | Germanton et al. |
| 5,036,925 A | 8/1991 | Wache |
| D326,043 S | 5/1992 | Hasegawa et al. |
| 5,149,998 A | 9/1992 | Wolcott |
| 5,155,421 A | 10/1992 | Hansson |
| 5,156,221 A | 10/1992 | Breitenmoser |
| 5,166,882 A | 11/1992 | Stambaugh |
| 5,174,045 A | 12/1992 | Thompson et al. |
| 5,200,661 A | 4/1993 | Shramo et al. |
| 5,201,373 A | 4/1993 | Bloechle |
| 5,212,862 A | 5/1993 | Eshghy |
| 5,232,328 A | 8/1993 | Owczarc et al. |
| D339,279 S | 9/1993 | Baum |
| 5,241,861 A | 9/1993 | Hulsing, II |
| 5,245,747 A | 9/1993 | Hansson |
| 5,247,466 A | 9/1993 | Shimada et al. |
| 5,284,217 A | 2/1994 | Eshghy |
| 5,311,069 A | 5/1994 | Austin |
| 5,345,382 A | 9/1994 | Kao |
| 5,357,179 A | 10/1994 | Abbagnaro et al. |
| 5,361,022 A | 11/1994 | Brown |
| 5,365,155 A | 11/1994 | Zimmerman et al. |
| 5,383,363 A | 1/1995 | Kulmaczewski |
| 5,401,124 A | 3/1995 | Hettich |
| 5,418,422 A | 5/1995 | Vink et al. |
| 5,425,165 A | 6/1995 | Shramo et al. |
| 5,440,218 A | 8/1995 | Oldenkamp |
| 5,476,014 A | 12/1995 | Lampe et al. |
| 5,484,026 A | 1/1996 | Susaki et al. |
| 5,493,909 A | 2/1996 | Araki |
| 5,535,306 A | 7/1996 | Stevens |
| 5,538,089 A | 7/1996 | Sanford |
| 5,557,990 A | 9/1996 | Shin |
| 5,563,482 A | 10/1996 | Shaw et al. |
| 5,584,619 A | 12/1996 | Guzella |
| 5,589,644 A | 12/1996 | Becker et al. |
| 5,615,130 A | 3/1997 | Bolan et al. |
| D378,727 S | 4/1997 | Kikuchi |
| 5,619,085 A | 4/1997 | Shramo |
| 5,635,638 A | 6/1997 | Geen |
| 5,637,968 A | 6/1997 | Kaniec et al. |
| D387,964 S | 12/1997 | Urvoy |
| 5,701,961 A | 12/1997 | Warner et al. |
| 5,704,435 A | 1/1998 | Meyer |
| 5,714,698 A | 2/1998 | Tokioka et al. |
| D392,532 S | 3/1998 | Shiao |
| D392,535 S | 3/1998 | Vasudeva et al. |
| 5,730,232 A | 3/1998 | Mixer |
| 5,738,177 A | 4/1998 | Schell et al. |
| 5,754,019 A | 5/1998 | Walz |
| 5,793,168 A | 8/1998 | Vitunic |
| 5,795,988 A | 8/1998 | Lo et al. |
| 5,806,401 A | 9/1998 | Rajala et al. |
| 5,812,420 A | 9/1998 | Takahashi |
| 5,831,402 A | 11/1998 | Yang |
| 5,879,111 A | 3/1999 | Stock et al. |
| 5,914,882 A | 6/1999 | Yeghiazarians |
| 5,954,457 A | 9/1999 | Stock et al. |
| 5,971,091 A | 10/1999 | Kamen et al. |
| 5,981,557 A | 11/1999 | Nagasawa et al. |
| 5,984,020 A | 11/1999 | Meyer et al. |
| 5,996,707 A | 12/1999 | Thome et al. |
| 6,005,489 A | 12/1999 | Siegle et al. |
| 6,044,918 A | 4/2000 | Noser et al. |
| 6,049,460 A | 4/2000 | Lin |
| 6,055,142 A | 4/2000 | Von Keudell et al. |
| 6,058,815 A | 5/2000 | Habermehl |
| 6,062,939 A | 5/2000 | Parker et al. |
| 6,111,515 A | 8/2000 | Schaer et al. |
| 6,129,699 A | 10/2000 | Haight et al. |
| 6,138,629 A | 10/2000 | Masberg et al. |
| 6,147,626 A | 11/2000 | Sakakibara |
| 6,158,929 A | 12/2000 | Fisher |
| 6,161,629 A | 12/2000 | Hohmann et al. |
| 6,209,394 B1 | 4/2001 | Ferrari et al. |
| 6,236,177 B1 | 5/2001 | Zick et al. |
| 6,387,725 B1 | 5/2002 | Ferrari et al. |
| 6,408,252 B1 | 6/2002 | DeSmet |
| 6,415,875 B1 | 7/2002 | Mexner et al. |
| 6,479,958 B1 | 11/2002 | Thompson et al. |
| 6,516,896 B1 | 2/2003 | Bookshar et al. |
| 6,567,068 B2 | 5/2003 | Rekimoto |
| 6,581,714 B1 | 6/2003 | Kamen et al. |
| 6,612,034 B2 | 9/2003 | Damstra |
| 6,640,733 B2 | 11/2003 | Huffmeyer |
| D485,737 S | 1/2004 | Schaub et al. |
| D493,888 S | 8/2004 | Reschke |
| D494,829 S | 8/2004 | Lin |
| 6,779,952 B2 | 8/2004 | Zhang |
| 6,796,921 B1 | 9/2004 | Buck et al. |
| 6,834,730 B2 | 12/2004 | Gass et al. |
| 6,836,614 B2 | 12/2004 | Gilmore |
| 6,842,991 B2 | 1/2005 | Levi et al. |
| 6,843,140 B2 | 1/2005 | Osselmann et al. |
| 6,871,128 B2 | 3/2005 | Kouno et al. |
| 6,910,540 B2 | 6/2005 | Totsu |
| 6,923,268 B2 | 8/2005 | Totsu |
| 6,965,835 B2 | 11/2005 | McGee et al. |
| 6,968,908 B2 | 11/2005 | Tokunaga |
| D513,160 S | 12/2005 | DeBoer et al. |
| 6,983,506 B1 | 1/2006 | Brown |
| D517,634 S | 3/2006 | Nunez et al. |
| 7,011,165 B2 | 3/2006 | Kristen et al. |
| 7,036,703 B2 | 5/2006 | Grazioli et al. |
| 7,055,620 B2 * | 6/2006 | Nadig et al. .................. 173/2 |
| 7,055,622 B2 | 6/2006 | Bone |
| 7,090,030 B2 | 8/2006 | Miller |
| 7,121,358 B2 | 10/2006 | Gass et al. |
| 7,121,598 B2 | 10/2006 | Pourtier et al. |
| 7,134,364 B2 | 11/2006 | Kageler et al. |

| | | | |
|---|---|---|---|
| 7,154,406 B1 | 12/2006 | Judge et al. | |
| D534,651 S | 1/2007 | Bruce et al. | |
| 7,182,148 B1 | 2/2007 | Szieff | |
| 7,197,961 B2 | 4/2007 | Kagelelr et al. | |
| 7,225,884 B2 | 6/2007 | Aeberhard | |
| 7,234,536 B2 | 6/2007 | Scholl | |
| 7,331,406 B2 | 2/2008 | Wottreng et al. | |
| 7,347,158 B2 | 3/2008 | Hawkes | |
| D565,380 S | 4/2008 | Rinner | |
| 7,359,816 B2 | 4/2008 | Kumar et al. | |
| 7,372,226 B2 | 5/2008 | Wiker et al. | |
| 7,395,871 B2 | 7/2008 | Carrier et al. | |
| 7,400,106 B2 | 7/2008 | DeCicco et al. | |
| 7,410,006 B2 | 8/2008 | Zhang | |
| 7,456,603 B2 | 11/2008 | Kanekawa et al. | |
| 7,463,952 B2 | 12/2008 | Bidou et al. | |
| 7,469,753 B2 | 12/2008 | Klemn et al. | |
| 7,487,844 B2 | 2/2009 | DeCicco et al. | |
| 7,487,845 B2 | 2/2009 | Carrier et al. | |
| 7,498,526 B2 | 3/2009 | Lohr et al. | |
| 7,504,791 B2 | 3/2009 | Sieber et al. | |
| 7,506,694 B2 | 3/2009 | Stirm et al. | |
| 7,526,398 B1 | 4/2009 | Choi et al. | |
| 7,546,785 B2 | 6/2009 | Roehm et al. | |
| 7,551,411 B2 | 6/2009 | Woods et al. | |
| 7,552,781 B2 | 6/2009 | Zhang et al. | |
| 7,565,844 B2 | 7/2009 | Crass et al. | |
| D606,827 S | 12/2009 | Fritz et al. | |
| 7,642,741 B2 | 1/2010 | Sidman | |
| 7,650,699 B2 | 1/2010 | Yamamoto | |
| 7,681,659 B2 | 3/2010 | Zhang et al. | |
| 7,682,035 B2 | 3/2010 | Wuensch et al. | |
| 7,688,028 B2 | 3/2010 | Phillips et al. | |
| 7,689,378 B2 | 3/2010 | Kolen | |
| D613,144 S | 4/2010 | Lin | |
| 7,708,085 B2 | 5/2010 | DeCicco et al. | |
| 7,723,953 B2 | 5/2010 | Roehm et al. | |
| D618,527 S | 6/2010 | Deguglimo et al. | |
| 7,730,963 B2 | 6/2010 | Carrier et al. | |
| 7,774,155 B2 | 8/2010 | Sato et al. | |
| 7,832,286 B2 | 11/2010 | Nakagawa et al. | |
| 7,861,796 B2 | 1/2011 | DeCicco et al. | |
| 7,882,899 B2 * | 2/2011 | Borinato et al. | 173/176 |
| 7,882,900 B2 | 2/2011 | Borinato et al. | |
| 7,900,715 B2 | 3/2011 | Chen | |
| 7,912,664 B2 | 3/2011 | Rozelle | |
| 7,926,585 B2 | 4/2011 | Pozgay et al. | |
| 7,933,148 B2 | 4/2011 | Murayama et al. | |
| 7,936,148 B2 | 5/2011 | Roehm et al. | |
| 7,938,194 B2 * | 5/2011 | Carrier et al. | 173/2 |
| 7,942,084 B2 | 5/2011 | Wilson et al. | |
| 8,025,106 B2 | 9/2011 | Schmidt | |
| 8,136,382 B2 | 3/2012 | Stewart | |
| 8,179,069 B2 | 5/2012 | Matsunaga et al. | |
| 8,286,723 B2 * | 10/2012 | Puzio et al. | 173/1 |
| 2002/0033267 A1 | 3/2002 | Schweizer et al. | |
| 2002/0053892 A1 | 5/2002 | Schaer et al. | |
| 2002/0066632 A1 | 6/2002 | Ferdinand et al. | |
| 2002/0170754 A1 | 11/2002 | Heinzmann | |
| 2003/0000651 A1 | 1/2003 | Genser | |
| 2003/0037423 A1 | 2/2003 | Siegel | |
| 2003/0042859 A1 | 3/2003 | Gorti et al. | |
| 2003/0116332 A1 | 6/2003 | Nadig | |
| 2003/0196824 A1 | 10/2003 | Gass et al. | |
| 2004/0011632 A1 | 1/2004 | Hellmann et al. | |
| 2004/0069511 A1 | 4/2004 | Hasegawa et al. | |
| 2004/0104034 A1 | 6/2004 | Osselmann et al. | |
| 2004/0182175 A1 | 9/2004 | Day et al. | |
| 2004/0211573 A1 | 10/2004 | Carrier et al. | |
| 2004/0226124 A1 | 11/2004 | O'Banion et al. | |
| 2004/0226728 A1 | 11/2004 | Boeni et al. | |
| 2005/0000998 A1 | 1/2005 | Grazioli et al. | |
| 2005/0217874 A1 | 10/2005 | Forster et al. | |
| 2006/0081368 A1 | 4/2006 | Rosine et al. | |
| 2006/0081386 A1 | 4/2006 | Zhang | |
| 2006/0103733 A1 | 5/2006 | Grady et al. | |
| 2006/0124331 A1 | 6/2006 | Stirm et al. | |
| 2006/0243469 A1 | 11/2006 | Webster | |
| 2007/0068480 A1 | 3/2007 | Wiker et al. | |
| 2007/0084613 A1 | 4/2007 | Zhang et al. | |
| 2007/0095634 A1 | 5/2007 | Misuda | |
| 2007/0144270 A1 | 6/2007 | Crass et al. | |
| 2007/0256914 A1 | 11/2007 | Lohr et al. | |
| 2007/0281274 A1 | 12/2007 | Schraffran et al. | |
| 2008/0011102 A1 | 1/2008 | Schell et al. | |
| 2008/0110653 A1 | 5/2008 | Zhang et al. | |
| 2008/0276760 A1 | 11/2008 | Kim | |
| 2009/0051306 A1 | 2/2009 | Matsunaga et al. | |
| 2009/0065225 A1 | 3/2009 | Forster et al. | |
| 2009/0078057 A1 | 3/2009 | Schultz et al. | |
| 2009/0120657 A1 | 5/2009 | Carrier et al. | |
| 2009/0139738 A1 | 6/2009 | Lippek | |
| 2009/0211774 A1 | 8/2009 | Dvells, Jr. | |
| 2009/0295313 A1 | 12/2009 | Suzuki et al. | |
| 2010/0188245 A1 | 7/2010 | Nielsen et al. | |
| 2010/0189887 A1 | 7/2010 | Nielsen et al. | |
| 2010/0245086 A1 | 9/2010 | Nielsen et al. | |
| 2010/0247754 A1 | 9/2010 | Nielsen et al. | |
| 2010/0256939 A1 | 10/2010 | Borenstein | |
| 2010/0263591 A1 | 10/2010 | Nielsen et al. | |
| 2010/0263891 A1 | 10/2010 | Carrier et al. | |
| 2011/0079406 A1 | 4/2011 | Elsmark et al. | |
| 2011/0153081 A1 | 6/2011 | Romanov et al. | |
| 2011/0160903 A1 | 6/2011 | Romanov et al. | |
| 2011/0202175 A1 | 8/2011 | Romanov et al. | |
| 2011/0301900 A1 | 12/2011 | Patel | |
| 2012/0090863 A1 | 4/2012 | Puzio et al. | |

FOREIGN PATENT DOCUMENTS

| | | |
|---|---|---|
| DE | 3239847 | 5/1983 |
| DE | 3400124 | 7/1985 |
| DE | 3938787 | 5/1991 |
| DE | 4243317 | 6/1993 |
| DE | 4204420 | 8/1993 |
| DE | 4334933 | 4/1995 |
| DE | 19540718 | 5/1997 |
| DE | 19620124 | 7/1997 |
| DE | 19632363 | 1/1998 |
| DE | 19651124 | 5/1998 |
| DE | 19726006 | 9/1998 |
| DE | 19900882 | 7/2000 |
| DE | 10117121 | 10/2002 |
| DE | 10309414 | 9/2004 |
| DE | 10318798 | 11/2004 |
| DE | 10340710 | 3/2005 |
| DE | 10348756 | 5/2005 |
| DE | 102006016441 | 10/2007 |
| DE | 102007048052 | 4/2009 |
| DE | 102007062727 | 7/2009 |
| DE | 102009007977 | 7/2009 |
| DE | 102009001298 | 9/2010 |
| EP | 0018603 | 11/1980 |
| EP | 0199883 | 11/1986 |
| EP | 0303651 | 2/1989 |
| EP | 0345655 | 12/1989 |
| EP | 0666148 | 8/1995 |
| EP | 0771619 | 5/1997 |
| EP | 0773854 | 5/1997 |
| EP | 0841126 | 5/1998 |
| EP | 0841127 | 5/1998 |
| EP | 1008422 | 6/2000 |
| EP | 1151828 | 11/2001 |
| EP | 1188521 | 3/2002 |
| EP | 1201373 | 5/2002 |
| EP | 1379362 | 1/2004 |
| EP | 1391271 | 2/2004 |
| EP | 1447177 | 8/2004 |
| EP | 1452278 | 9/2004 |
| EP | 1470898 | 10/2004 |
| EP | 1524084 | 4/2005 |
| EP | 1670134 | 6/2006 |
| EP | 1711308 | 10/2006 |
| EP | 1878541 | 1/2008 |
| EP | 1900484 | 3/2008 |
| EP | 1398119 | 4/2010 |
| GB | 1261479 | 1/1972 |
| GB | 2086277 | 9/1981 |
| GB | 2306356 | 5/1997 |

| | | |
|---|---|---|
| GB | 2347100 | 8/2000 |
| GB | 2400811 | 10/2004 |
| GB | 2420843 | 6/2006 |
| GB | 2436959 | 10/2007 |
| JP | 60252213 | 12/1985 |
| JP | 04065677 | 3/1992 |
| JP | 4-226869 | 8/1992 |
| JP | 422689 | 8/1992 |
| JP | 07270444 | 10/1995 |
| JP | 8-132353 | 5/1996 |
| JP | 08128825 | 5/1996 |
| JP | 8197445 | 8/1996 |
| JP | 09038815 | 2/1997 |
| JP | 10-161701 | 6/1998 |
| JP | 10156739 | 6/1998 |
| JP | 2000-263304 | 9/2000 |
| JP | 2002-036142 | 2/2002 |
| JP | 2002-216599 | 8/2002 |
| JP | 2003-340620 | 12/2003 |
| JP | 2004-518551 | 6/2004 |
| JP | 2005-144625 | 6/2005 |
| JP | 2005144625 | 6/2005 |
| JP | 2008-516789 | 5/2008 |
| JP | 2011-500344 | 1/2011 |
| JP | 2011-519742 | 7/2011 |
| RU | 2103156 | 1/1998 |
| RU | 2238183 | 10/2004 |
| SU | 1366381 | 6/1986 |
| SU | 1426770 | 9/1988 |
| SU | 1521574 | 11/1989 |
| SU | 1558295 | 4/1990 |
| WO | WO 88/06508 | 9/1988 |
| WO | WO2004024398 | 3/2004 |
| WO | WO 2005/095061 | 10/2005 |
| WO | WO2005095061 | 10/2005 |
| WO | WO2006045072 | 4/2006 |
| WO | WO2009032314 | 3/2009 |
| WO | WO2009/083306 | 7/2009 |
| WO | WO2009136840 | 11/2009 |

OTHER PUBLICATIONS

The Bird™ 6D Input Device by Ascension Technology Corp., Burlington, VT 05402; Jul. 1990 (1 page).

Orientation Tracking for Humans and Robots Using Inertial Sensors by Naval Postgraduate School, Monterey, CA 93943 (8 pages); 1999.

Soap: a Pointing Device that Works in Mid-Air by Microsoft Research, Redmond, WA 98052 (4 pages); 2006.

3-Axis Accelerometer with Differential Sense Electronics by Bernhard E. Boser, Dept of Electrical Engineering and Computer Sciences of the University of California, Berkeley © 1996, 1997 (50 pages).

Making Nested Rotations Convenient for the User by Edward G. Britton, James S. Lipscomb & Michael E. Pique of the University of North Carolina at Chapel Hill, NC (6 pages); 1978.

Technology Forecast—Human Input/Output Devices © 1994 Price Waterhouse (24 pages).

Computer Society—Magic Wand: A Hand-Drawn Gesture Input Device in 3-D Space with Inertial Sensors by Samsung Advanced Institute of Technology of Suwon, Korea; Sep. 2004 (6 pages).

Portable Orientation Estimation Device Based on Accelerometers, Magnetometers and Gyroscope Sensors for Sensor Network by Tatsuya Harada, Hiroto Uchino, Taketoshi More & Tomomasa Sato of the University of Tokyo (authorized licensed use limited to University of North Carolina at Chapel Hill, Oct. 11, 2008 (6 pages).

Technical Overview IS-900 Motion Tracking System by InterSense, Inc. of Bedford, MA 01730 (10 pages); 1999.

Comparison of InterSense IS-900 System and Optical Systems by InterSense, Inc., Bedford, MA 01730; Jul. 12, 2004 (8 pages).

Inertial Sensing of Human Movement by H.J. Luinge; Ph.D. thesis, University of Twente, © 2002 (83 pages).

Estimation of Orientation With Gyroscopes and Accelerometers; by the First Joint BMES/EMBS Conference serving Hunanity, Advancing Technology Oct. 13-16, 1999 Atlanta, GA (1 page).

Development of a MEMS Gyroscope for Absolute Angle Measurement by Rajesh Rajamani, Adviser; Nov. 2004; (169 pages).

Inertial proprioceptive devices: Self-motion-sensing toys and tools by C. Verplaetse; IBM Journal, vol. 35, Nos. 3&4, 1996 (12 pages).

Study on the infrared remote-control lamp-gesture device; Source: Yingyong Jiguang/Applied Laser Technology; Oct. 1997 (1 page).

Tonshoff, H.K., Developments and Trends in Monitoring and Control of Machining Processes, Annals of the CIRP vol. 37/2/1988 pp. 611-622.

Husling, Rand, MEMS Inertial Rate and Acceleration Sensor, pp. 169-176, date Jan. 1998.

* cited by examiner

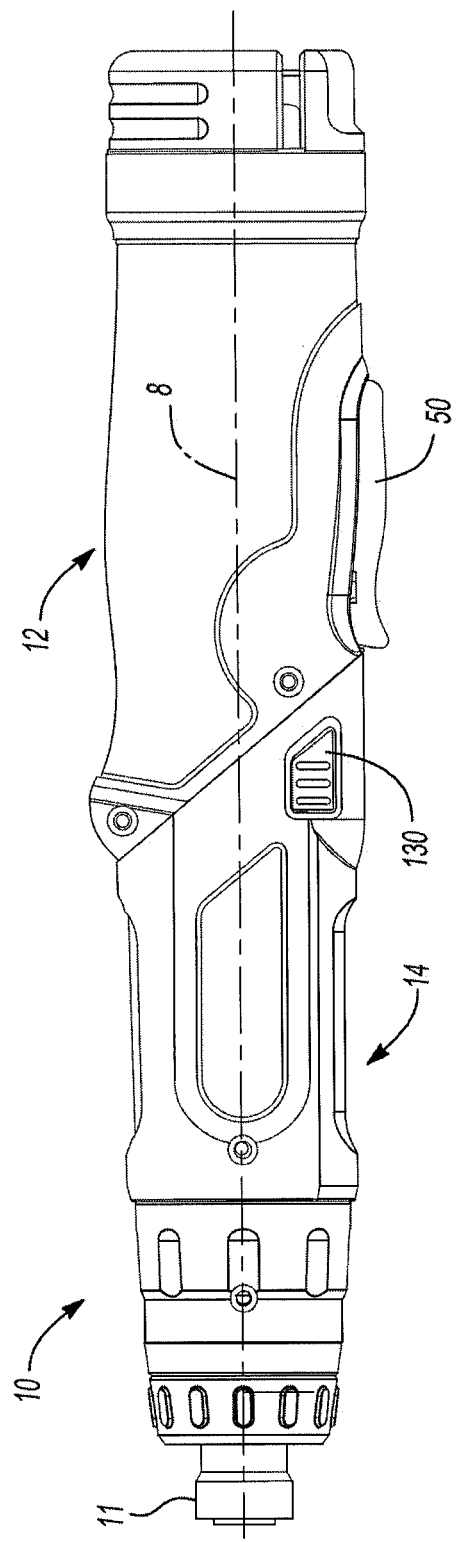
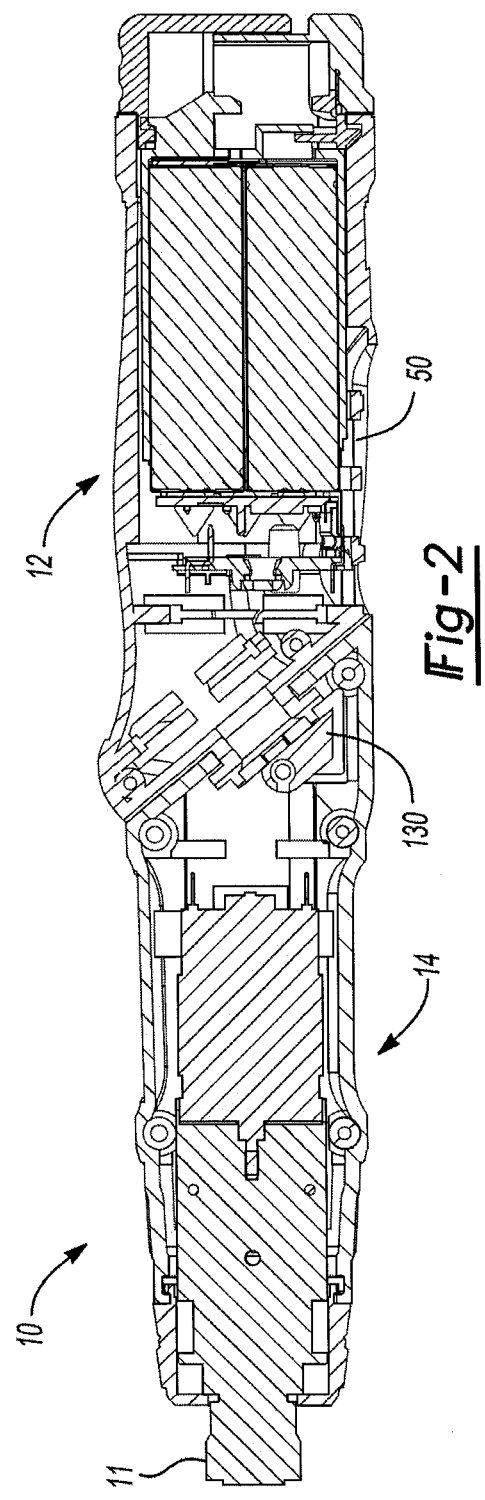

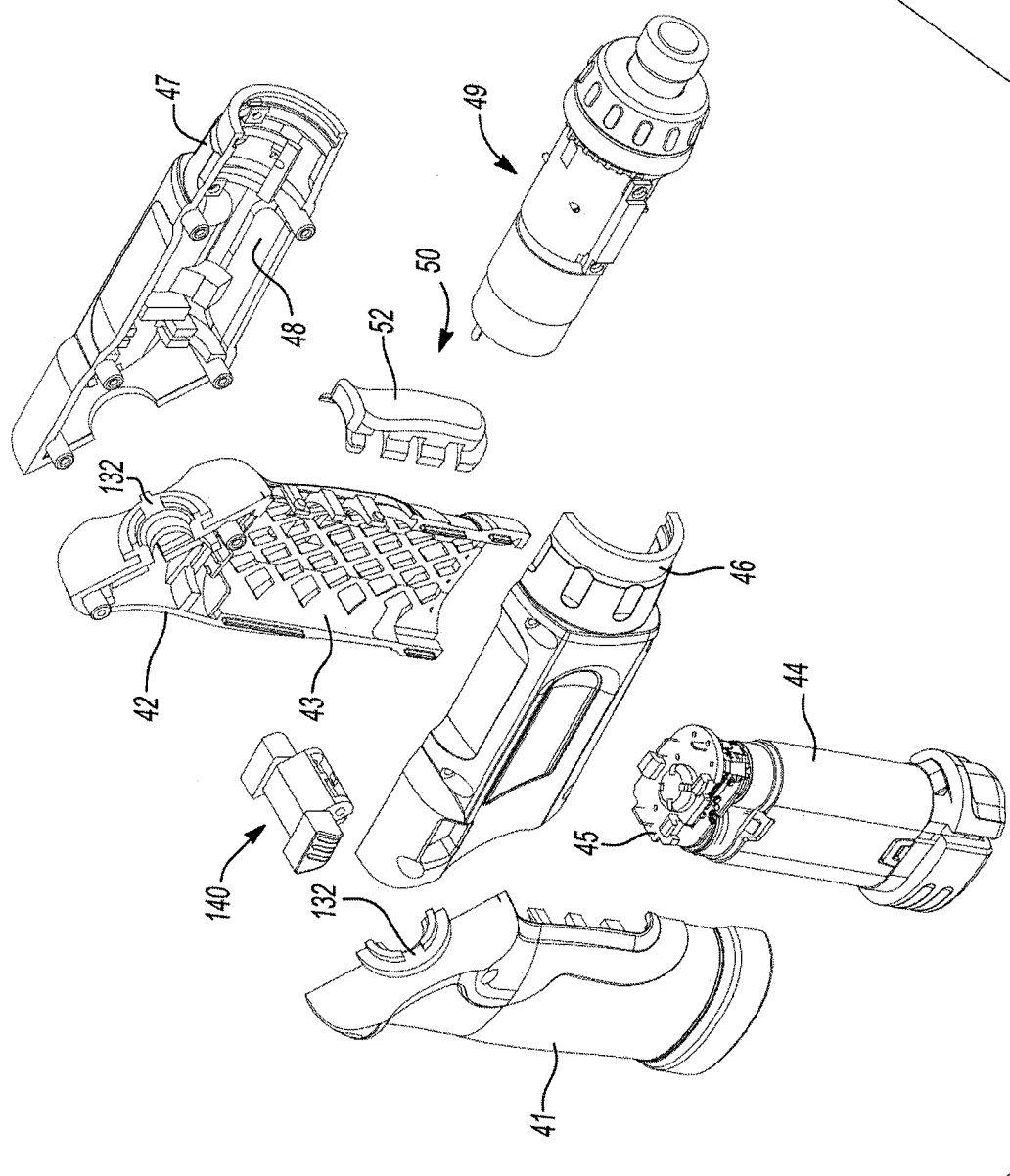

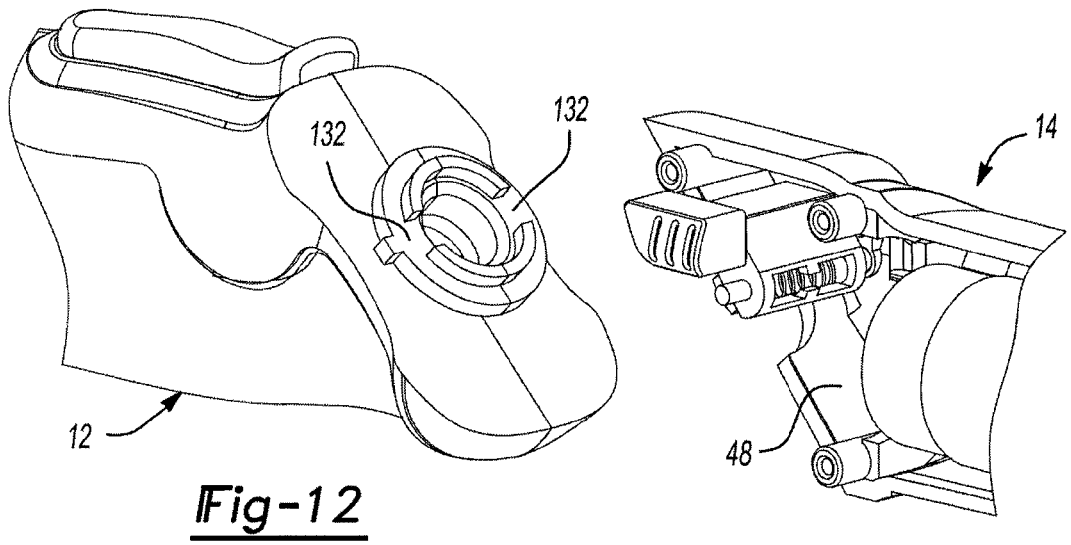
Fig-12
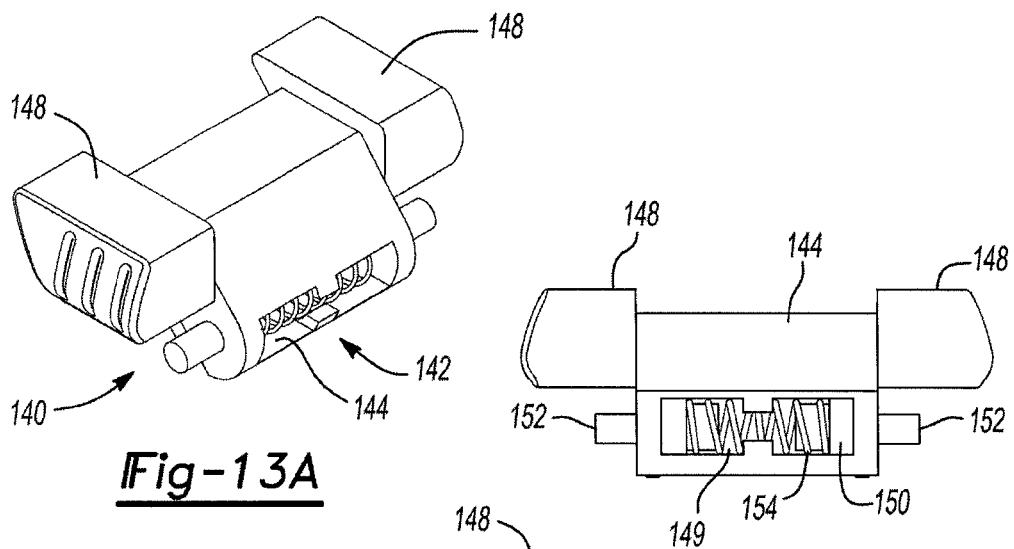
Fig-13A
Fig-13B
Fig-13C

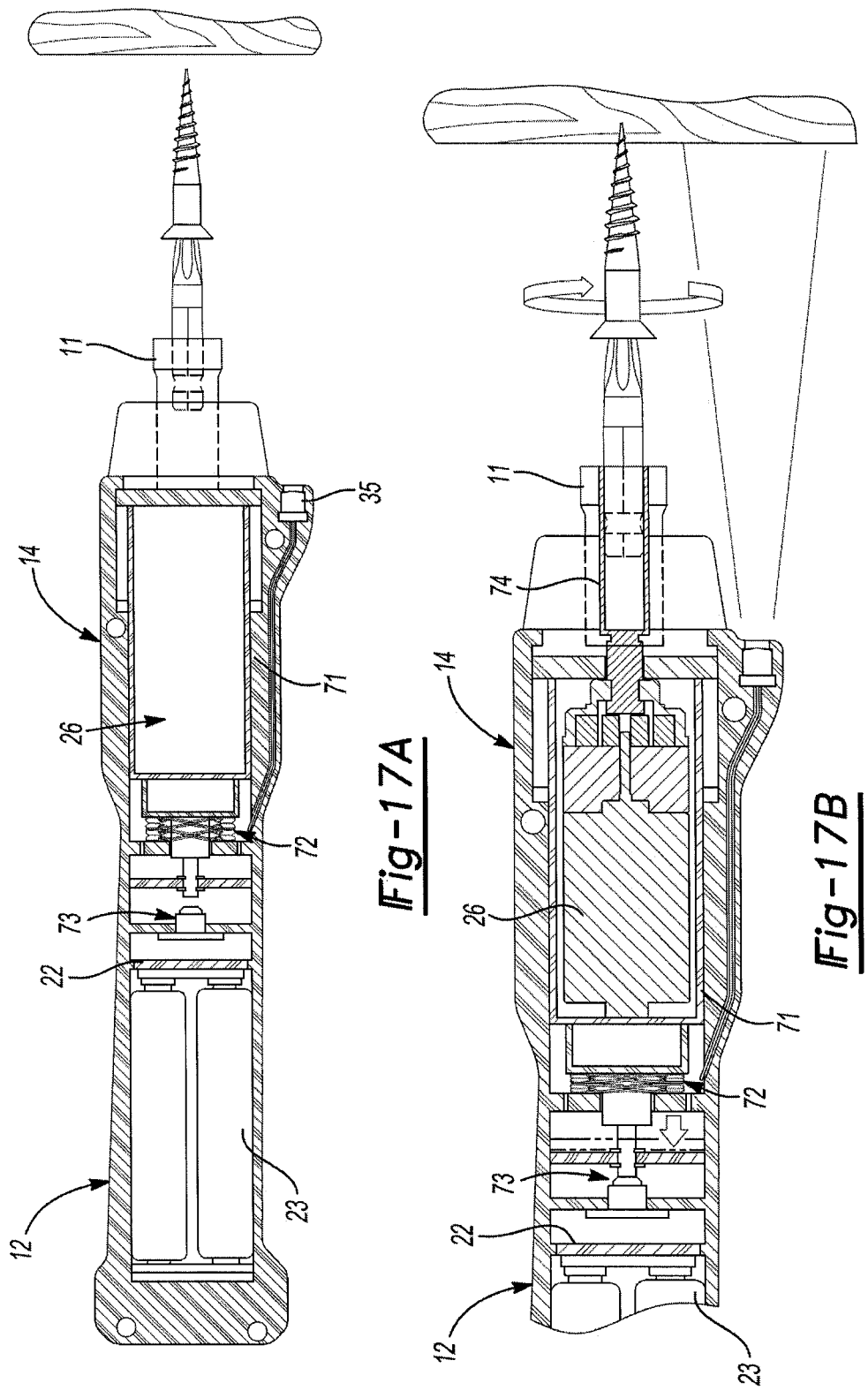

POWER SCREWDRIVER HAVING ROTARY INPUT CONTROL

CROSS-REFERENCE TO RELATED APPLICATIONS

This application is a continuation-in-part of U.S. patent application Ser. No. 13/120,873 filed on May 13, 2011, now U.S. Pat. No. 8,286,723, which is a national phase of PCT/US2011/020511 filed Jan. 7, 2011. This application also claims the benefit of U.S. Provisional Application Nos. 61/292,966, filed on Jan. 7, 2010, and 61/389,866, filed on Oct. 5, 2010. The entire disclosures of each of the above applications are incorporated herein by reference.

FIELD

The present disclosure relates generally to power tools, such as a power screwdriver, and, more particularly, to a control scheme that controls rotation of an output member of a tool based on rotary user input.

BACKGROUND

In present-day power tools, users may control tool output through the use of an input switch. This can be in the form of a digital switch in which the user turns the tool on with full output by pressing a button and turns the tool off by releasing the button. More commonly, it is in the form of an analog trigger switch in which the power delivered to the tool's motor is a function of trigger travel. In both of these configurations, the user grips the tool and uses one or more fingers to actuate the switch. The user's finger must travel linearly along one axis to control a rotational motion about a different axis. This makes it difficult for the user to directly compare trigger travel to output rotation and to make quick speed adjustments for finer control.

Another issue with this control method is the difficulty in assessing joint tightness. As a joint becomes tighter, the fastener becomes more reluctant to move farther into the material. Because the tool motor attempts to continue spinning while the output member slows down, a reactionary torque can be felt in the user's wrist as the user increases bias force in an attempt to keep the power tool stationary. In this current arrangement, the user must first sense tightness with the wrist before making the appropriate control adjustment with the finger.

This section provides background information related to the present disclosure which is not necessarily prior art.

SUMMARY

An improved method is provided for operating a power tool. The method includes: monitoring rotational motion of the power tool about an axis using a rotational motion sensor disposed in the power tool; determining a direction of the rotational motion about the axis; and driving the output member in a direction defined by the detected rotational motion of the tool, where the output member is driven by a motor residing in the power tool. This approach results in a highly intuitive method for operating the tool similar to the use of a manual screwdriver.

In one aspect of the disclosure, the improved operation methods are incorporated into a power tool. The power tool is comprised of: a housing; an output member at least partially contained in the housing and configured to rotate about a longitudinal axis; a motor contained in the housing and drivably connected to the output member to impart rotary motion thereto; a rotational motion sensor arranged in the housing at a location spatially separated from the output member and operable to detect rotational motion of the housing about the longitudinal axis of the output member; and a controller configured in the housing to receive a signal indicative of rotational motion from the rotational motion sensor. The controller determines a direction of the rotation motion of the housing about the axis and drives the motor in the same direction as the rotational motion of the housing.

In another aspect of the disclosure, the power tool may be further configured with a reamer tool.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

DRAWINGS

FIG. 1 is a perspective view of an exemplary power screwdriver;

FIG. 2 is a longitudinal section view of the power screwdriver of FIG. 1;

FIG. 4 is an exploded perspective view of the power screwdriver of FIG. 1;

FIG. 12 is a partial sectional view of the power screwdriver of FIG. 1 illustrating the interface between the first and second housing portions;

FIGS. 13A-13C are perspective views illustrating an exemplary lock bar assembly used in the power screwdriver;

FIGS. 17A-17C are cross-sectional views illustrating alternative on/off and sensing mechanisms;

Figure 21:
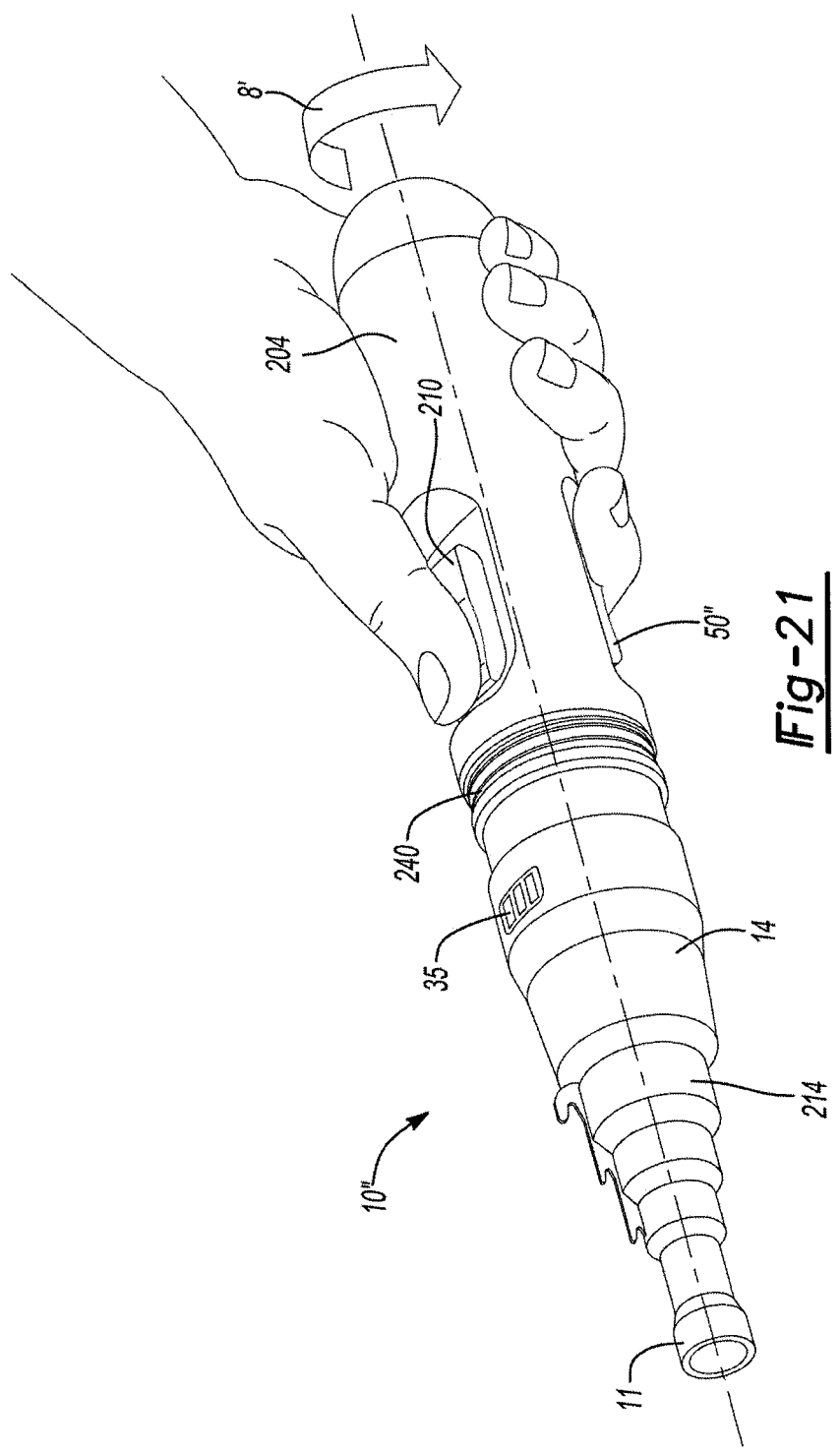
FIG. 21 is a perspective view of a third exemplary power screwdriver.
Figure 22A:
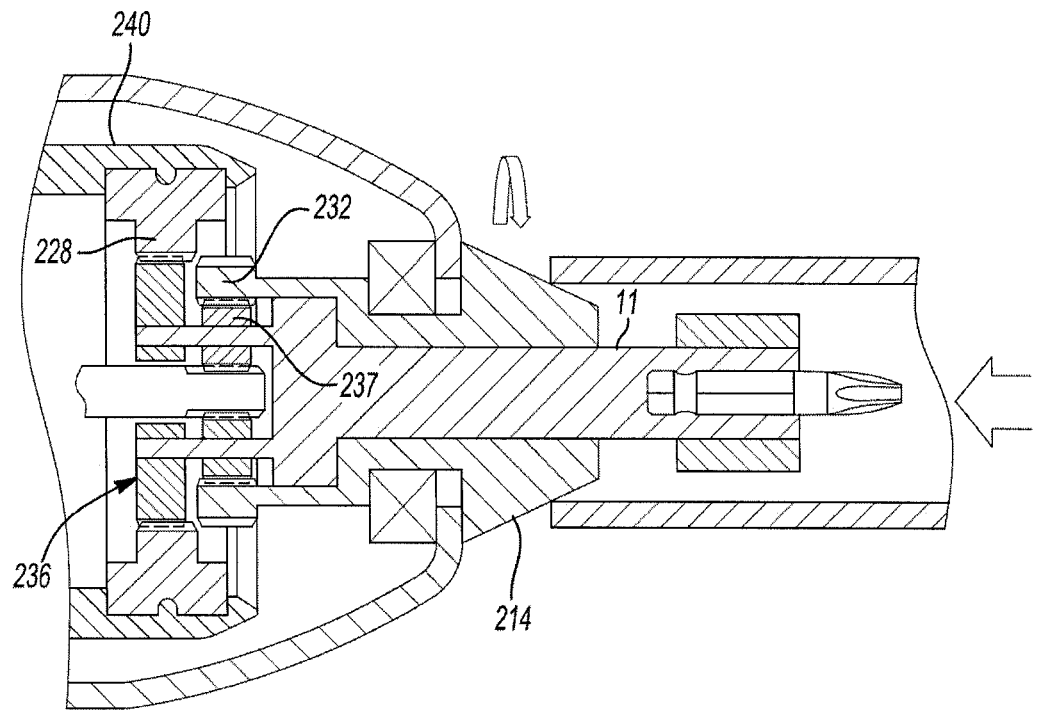
Figure 22B:
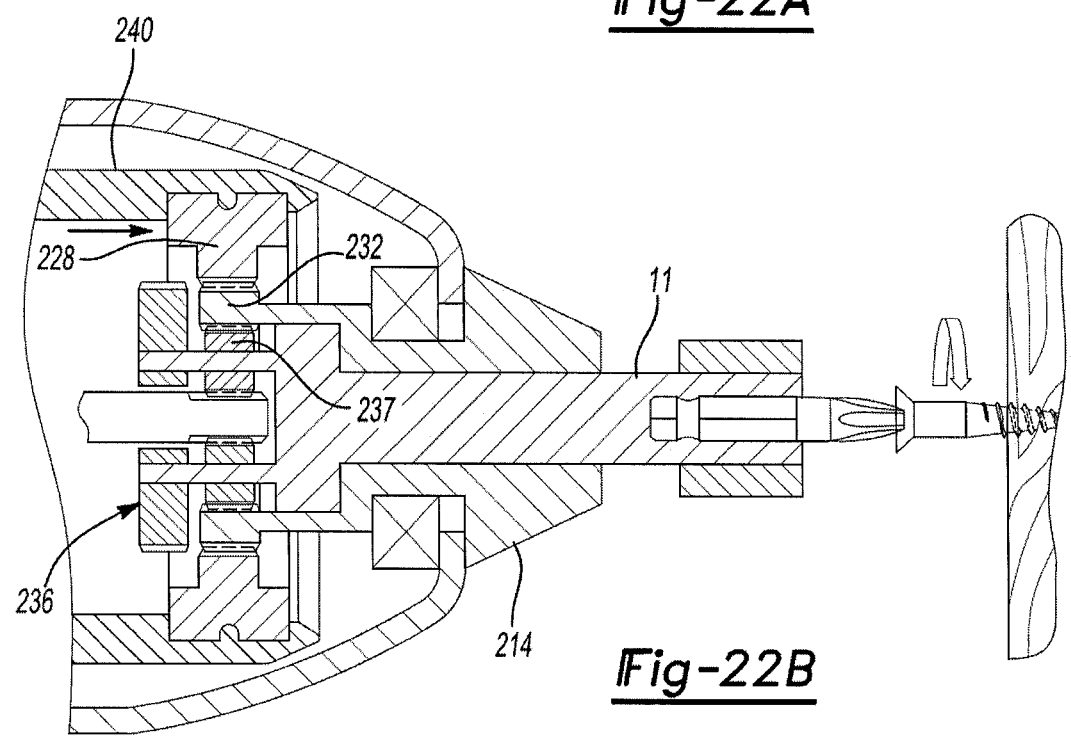
Figure 23A:
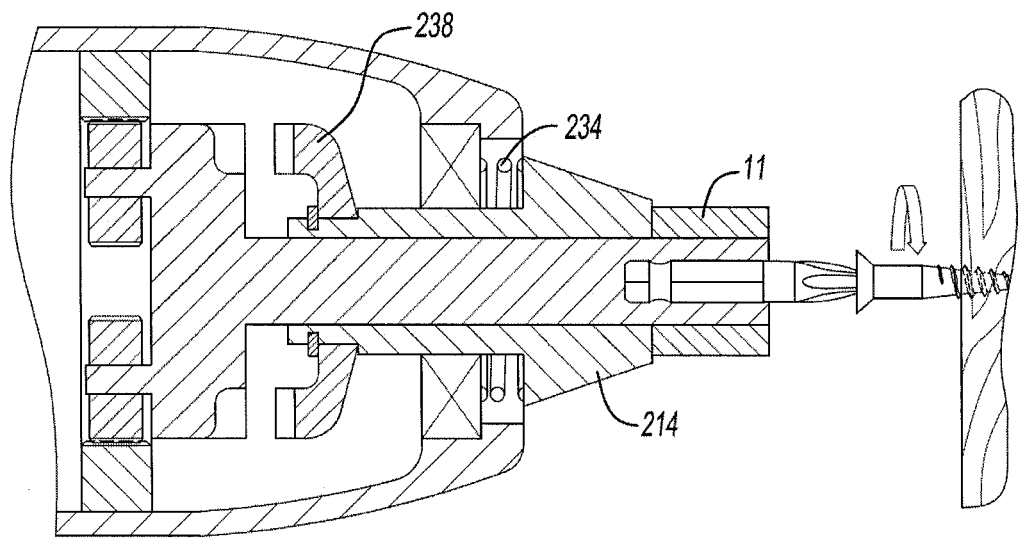
Figure 23B:
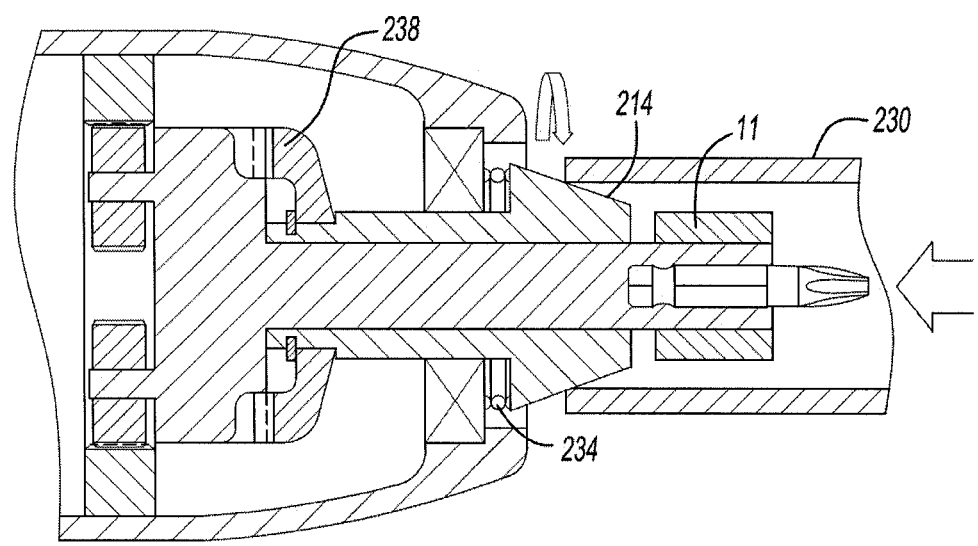

FIGS. 22A-B are cross-sectional views of the exemplary power screwdriver of FIG. 21, illustrating one way to activate the reaming tool; and FIGS. 23A-B are cross-sectional views of the exemplary power screwdriver of FIG. 21, illustrating a second way to activate the reaming tool.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

With reference to FIGS. 1 and 2, an exemplary power screwdriver is indicated generally by reference number 10. The screwdriver 10 is comprised generally of an output member 11 configured to rotate about a longitudinal axis 8 and a motor 26 driveably connected to the output member 11 to impart rotary motions thereto. Tool operation is controlled by a trigger switch, a rotational rate sensor and a controller in a manner further described below. A chuck or some other type of tool holder may be affixed to the end of the output member 11. Further details regarding an exemplary bit holder are set forth in U.S. patent application Ser. No. 12/394,426 which is incorporated herein by reference. Other components needed to construct the screwdriver 10 are further described below. While the following description is provided with reference to screwdriver 10, it is readily understood that the broader aspects of the present disclosure are applicable to other types of power tools, including but not limited to tools having elongated housings aligned concentrically with the output member of the tool.

The housing assembly for the screwdriver 10 is preferably further comprised of a first housing portion 12 and a second housing portion 14. The first housing portion 12 defines a handle for the tool and can be mounted to the second housing portion 14. The first housing portion 12 is rotatable in relation to the second housing portion 14. In a first arrangement, the first and second housing portions 12, 14 are aligned with each other along the longitudinal axis of the tool as shown in FIG. 1 This arrangement is referred to herein as an "inline" configuration.

Figure 3:
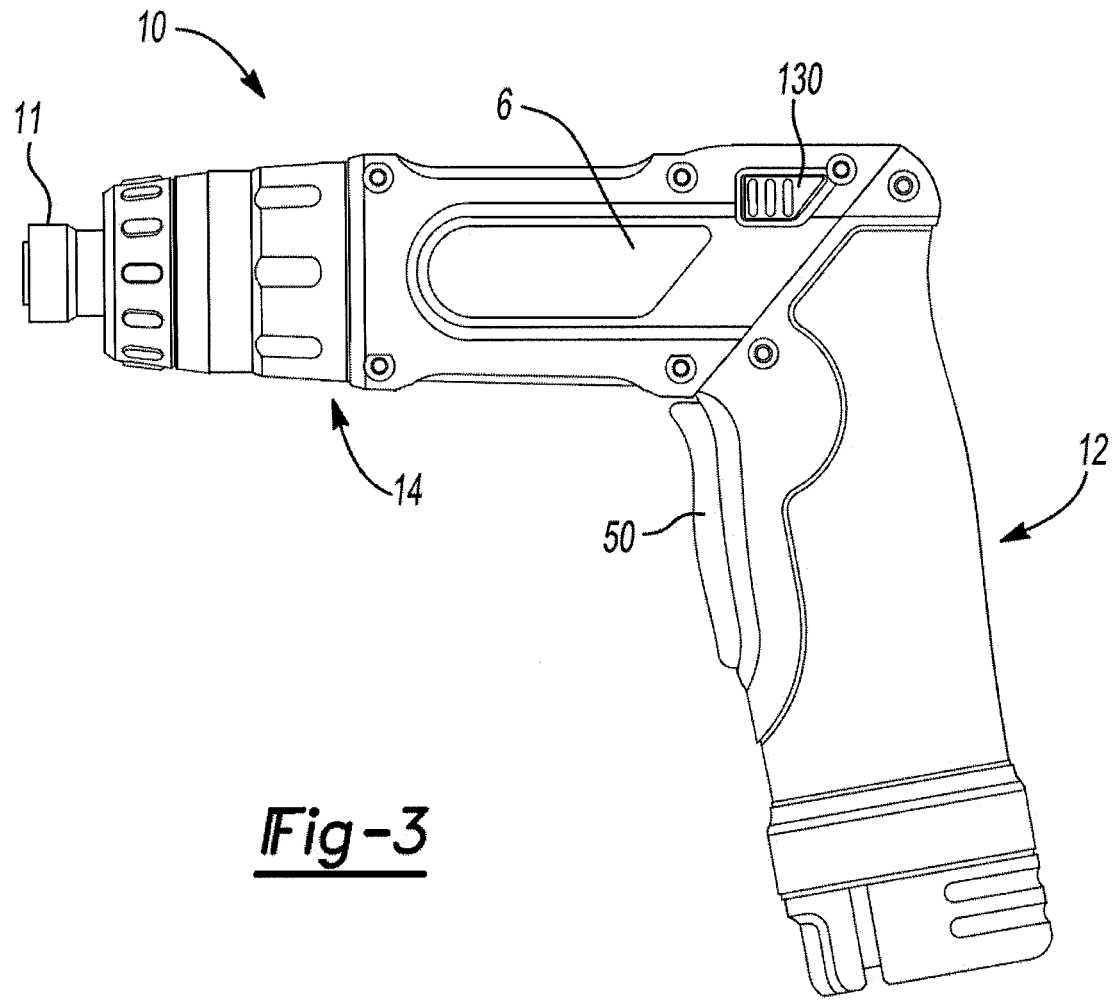
FIG. 3 is a perspective view of the power screwdriver of FIG. 1 with the handle being disposed in a pistol-grip position.

The screwdriver 10 may be further configured into a "pistol-type" arrangement as shown in FIG. 3. This second arrangement is achieved by depressing a rotation release mechanism 130 located in the side of the second housing portion 14. Upon depressing the release mechanism 130, the first housing portion 12 will rotate 180 degrees in relation to the second housing portion 14, thereby resulting in the "pistol-type" arrangement. In the second arrangement, the first and second housing portions 12, 14 form a concave elongated groove 6 that extends from one side of the tool continuously around the back to the other side of the tool. By placing an index finger in the groove 6 on opposing sides, the tool operator can better grip the tool, and the positioning of the palm directly behind the longitudinal axis 8 allows the operator to better control the screwdriver.

With reference to FIGS. 2 and 4, the first housing portion 12 can be formed from a pair of housing shells 41, 42 that can cooperate to define an internal cavity 43. The internal cavity 43 is configured to receive a rechargeable battery pack 44 comprised of one or more battery cells. A circuit board 45 for interfacing the battery terminals with other components is fixedly mounted in the internal cavity 43 of the first housing portion 12. The trigger switch assembly 50 is also pivotably coupled to the first housing portion 12.

Figure 14A:
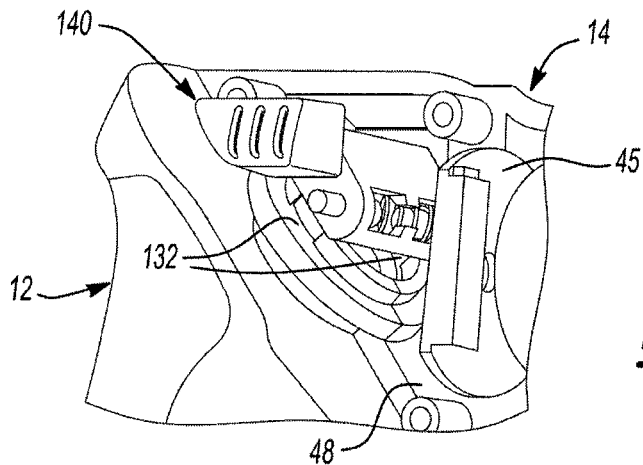
FIGS. 14A-14C are partial sectional views illustrating the operation of the lock bar assembly during configuration of the screwdriver from the "pistol" arrangement to the "inline" arrangement.

Likewise, the second housing portion 14 can be formed of a pair of housing shells 46, 47 that can cooperate to define another internal cavity 48. The second housing portion 14 is configured to receive the powertrain assembly 49 which includes the motor 26, the transmission, and the output member 11. The power train assembly 49 can be mounted in the internal cavity 48 such that a rotational axis of the output member is disposed concentrically about the longitudinal axis of the second housing portion 14. One or more circuit boards 45 are also fixedly mounted in the internal cavity 48 of the second housing portion 14 (as shown in FIG. 14A). Components mounted to the circuit board may include the rotational rate sensor 22, the microcontroller 24 as well as other circuitry for operating the tool. The second housing portion 14 is further configured to support the rotation release mechanism 130.

With reference to FIGS. 3, 4, 12, 13, and 14, the rotary release mechanism 130 can be mounted in either the first or second housing portions 12, 14. The release mechanism 130 comprises a lock bar assembly 140 that engages with a set of locking features 132 associated with the other one of the first and second housing portions. In the exemplary embodiment, the lock bar assembly 140 is slidably mounted inside the second housing portion 14. The lock bar assembly 140 is positioned preferably so that it may be actuated by the thumb of a hand gripping the first housing portion 12 of the tool. Other placements of the lock bar assembly and/or other types of lock bar assemblies are also contemplated. Further details regarding another lock bar assembly is found in U.S. patent application Ser. No. 12/783,850 which was filed on May 20, 2010 and is incorporated herein by reference.

The lock bar assembly 140 is comprised of a lock bar 142 and a biasing system 150. The lock bar 142 is further defined as a bar body 144, two push members 148 and a pair of stop members 146. The push members 148 are integrally formed on each end of the bar body 144. The bar body 144 can be an elongated structure having a pocket 149 into which the biasing system 150 is received. The pocket 149 can be tailored to the particular configuration of the biasing system. In the exemplary embodiment, the biasing system 150 is comprised of two pins 152 and a spring 154. Each pin 152 is inserted into opposing ends of the spring 154 and includes an integral collar that serves to retain the pin in the pocket. When placed into the pocket, the other end of each pin protrudes through an aperture formed in an end of the bar body with the collar positioned between the inner wall of the pocket and the spring.

The stop members 146 are disposed on opposite sides of the bar body 144 and integrally formed with the bar body 144. The stop members 146 can be further defined as annular segments that extend outwardly from a bottom surface of the bar body 144. In a locking position, the stop members 146 are arranged to engage the set of locking features 132 that are integrally formed on the shell assembly of the first housing portion 12 as best seen in FIG. 14A. The biasing system 150 operates to bias the lock bar assembly 140 into the locking position. In this locking position, the engagement of the stop members 146 with the locking features 132 prevents the first housing portion from being rotated in relation to the second housing portion.

Figure 14B:
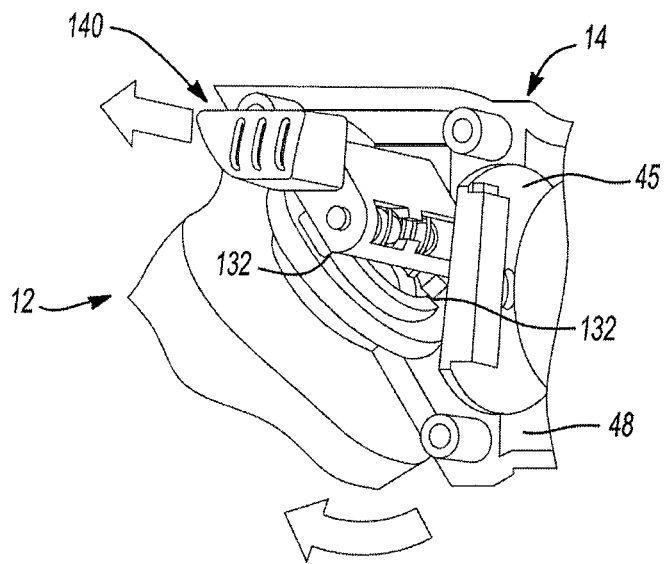
Figure 14C:
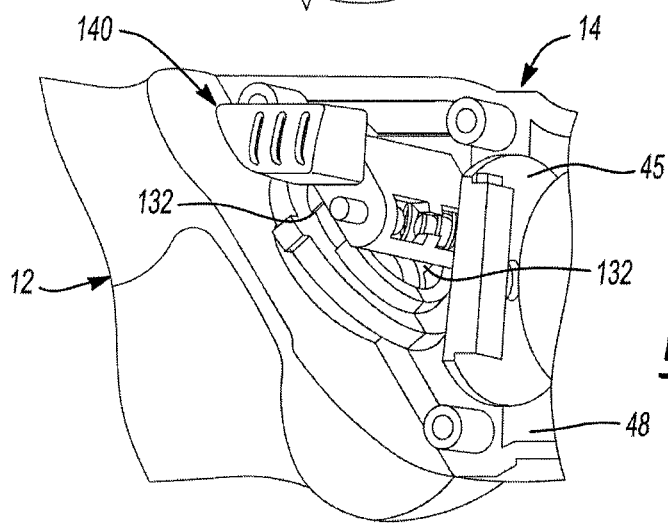

To actuate the lock bar assembly 140, the push members 148 protrude through a push member aperture formed on each side of the second housing portion 14. When the lock bar assembly 140 is translated in either direction by the tool operator, the stop members 146 slide out of engagement with the locking features 132 as shown in FIG. 14B, thereby enabling the first housing portion to rotate freely in relation to the second housing portion. Of note, the push members 148 are offset from the center axis on which the first housing portion 12 and the second housing portion 14 rotate with respect to one another. This arrangement creates an inertial moment that helps to rotate the second housing portion 14 in relation to the first housing portion 12. With a single actuating force, the tool operator can release the lock bar assembly 140 and continue rotating the second housing portion. The user can then continue to rotate the second housing portion. The user can then continue to rotate the second housing portion (e.g., 180 degrees) until the stop members re-engage the locking features. Once the stop members 146 are aligned with the locking features, the biasing system 150 biases the lock bar assembly 140 into a locking position as shown in FIG. 14C.

An improved user-input method for the screwdriver 10 is proposed. Briefly, tool rotation is used to control rotation of the output member. In an exemplary embodiment rotational motion of the tool about the longitudinal axis of the output member is monitored using the rotational motion sensor disposed in the power tool. The angular velocity, angular displacement, and/or direction of rotation can be measured and used as a basis for driving the output member. The resulting configuration improves upon the shortcomings of conventional input schemes. With the proposed configuration, the control input and the resulting output occur as a rotation about the axis. This results in a highly intuitive control similar to the use of a manual screwdriver. While the following description describes rotation about the longitudinal axis of the output member, it is readily understood that the control input could be rotational about a different axis associated with the tool. For example, the control input could be about an axis offset but in parallel with the axis of the output member or even an axis askew from the axis of the output member. Further details regarding the control scheme may be found in U.S. Patent Application No. 61/292,966 which was filed on Jan. 7, 2010, and is incorporated herein by reference.

This type of control scheme requires the tool to know when the operator would like to perform work. One possible solution is a switch that the tool operator actuates to begin work. For example, the switch may be a single pole, single throw switch accessible on the exterior of the tool. When the operator places the switch in an ON position, the tool is powered up (i.e., battery is connected to the controller and other electronic components). Rotational motion is detected and acted upon only when the tool is powered up. When the operator places the switch in an OFF position, the tool is powered down and no longer operational.

Figure 5A:
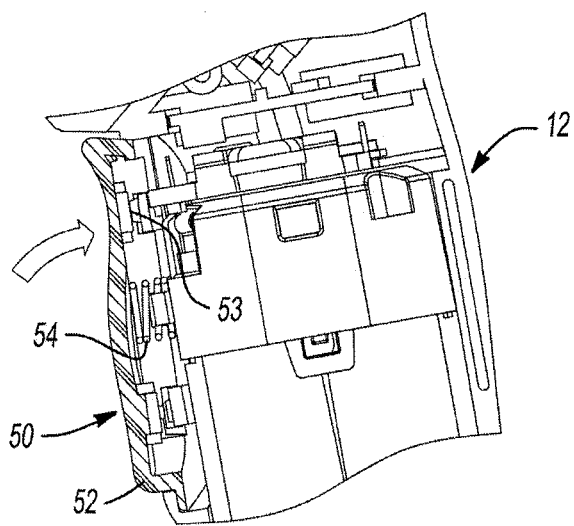
FIGS. 5A-5C are fragmentary section views depicting different ways of actuating the trigger assembly of the power screwdriver of FIG. 1.
Figure 5B:
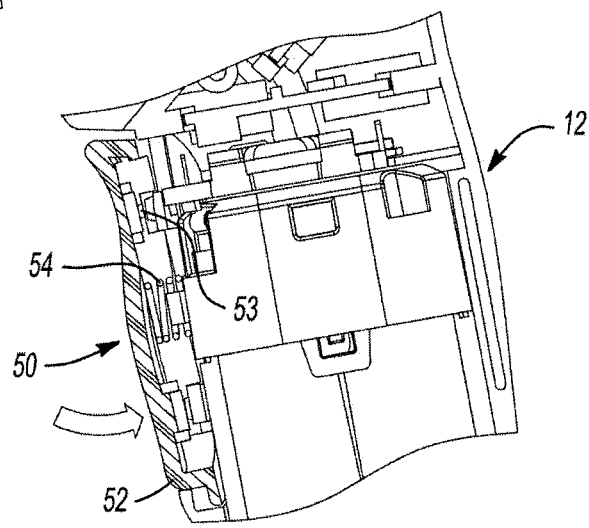
Figure 5C:
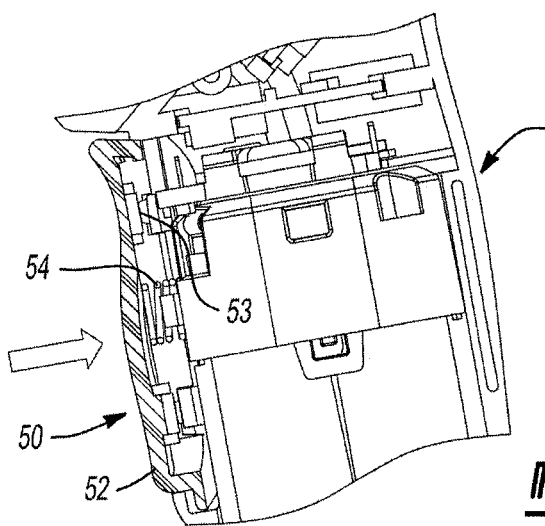
Figure 6C:
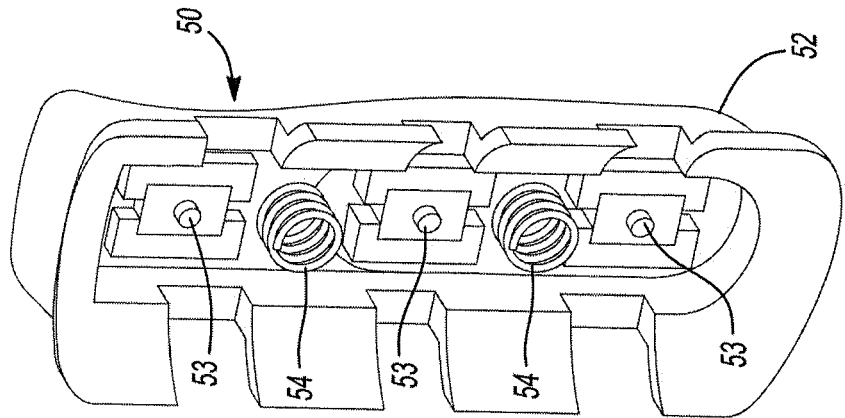
FIGS. 6A-6C are perspective views of exemplary embodiments of the trigger assembly.
Figure 6B:
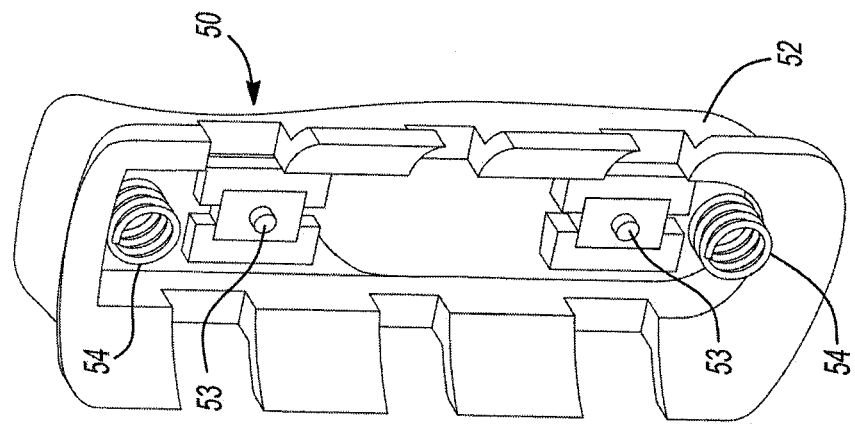
Figure 6A:
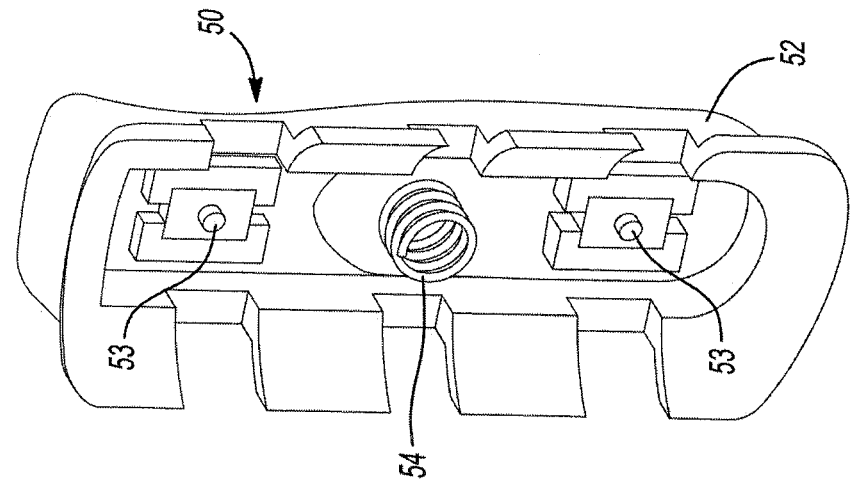
Figure 7:
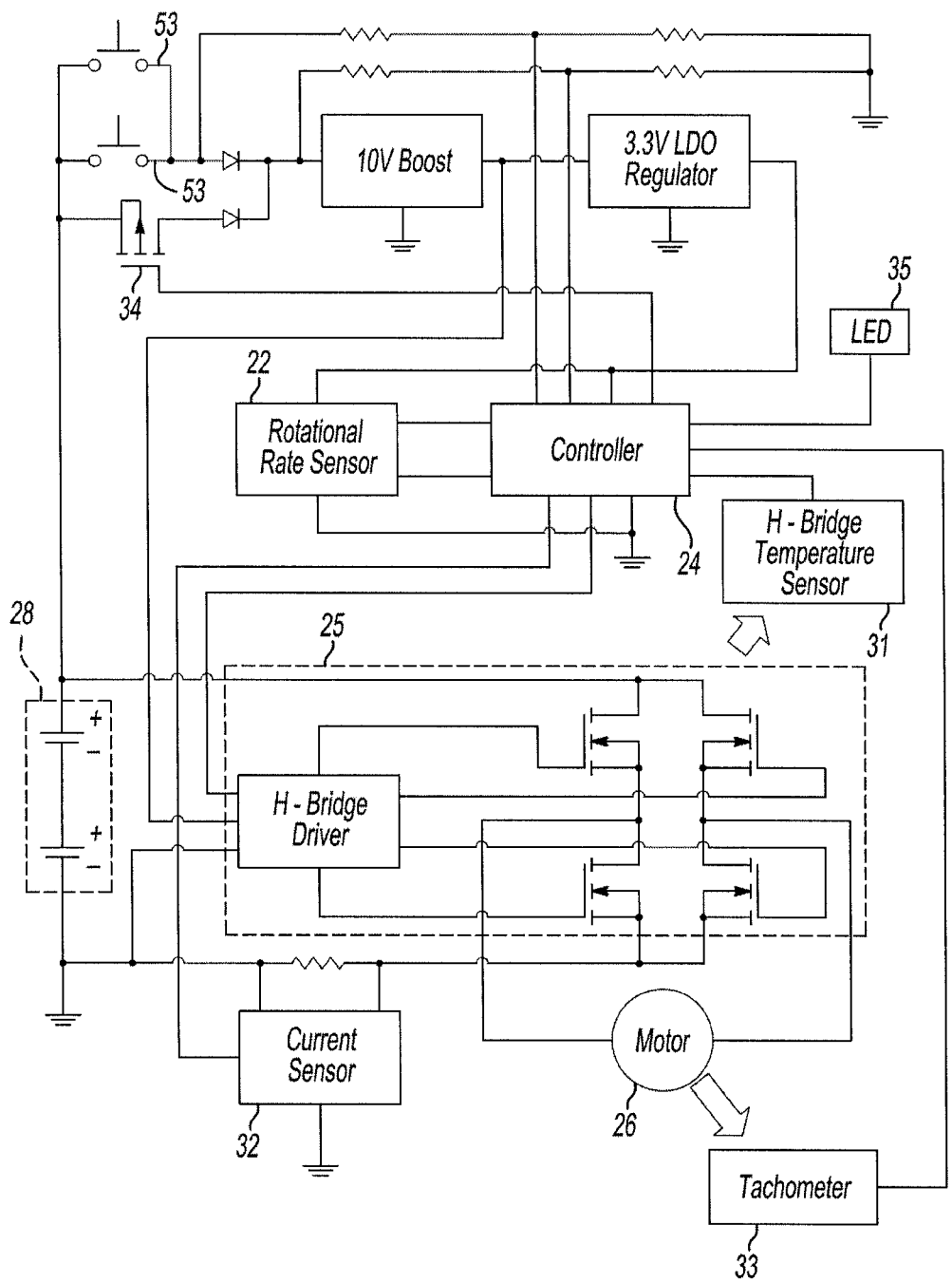
FIG. 7 is a schematic for an exemplary implementation of the power screwdriver.

In the exemplary embodiment, the tool operator actuates a trigger switch assembly 50 to initiate tool operation. With reference to FIGS. 5A-5C, the trigger switch assembly 50 is comprised primarily of an elongated casing 52 that houses at least one momentary switch 53 and a biasing member 54, such as a spring. The elongated casing 52 is movably coupled to the first housing portion 12 in such a way that allows it to translate and/or pivot about any point of contact by the operator. For example, if the tool operator presses near the top or bottom of the elongated casing 52, the trigger switch assembly 50 pivots as shown in FIGS. 5A and 5B, respectively. If the tool operator presses near the middle of the elongated casing 52, the trigger switch assembly 50 is translated inward towards the tool body as shown in FIG. 5C. In any case, the force applied to the elongated casing 52 by the operator will depress at least one of the switches from an OFF position to an ON position. If there are two or more switches 53, the switches 53 are arranged electrically in parallel with each other (as shown in FIG. 7) such that only one of the switches needs to be actuated to power up the tool. When the operator releases the trigger, the biasing member 54 biases the elongated casing 52 away from the tool, thereby returning each of the switches to an OFF position. The elongated shape of the casing helps the operator to actuate the switch from different grip positions. It is envisioned that the trigger switch assembly 50 may be comprised of more than two switches 53 and/or more than one biasing member 54 as shown in FIGS. 6A-6C.

Figure 16:
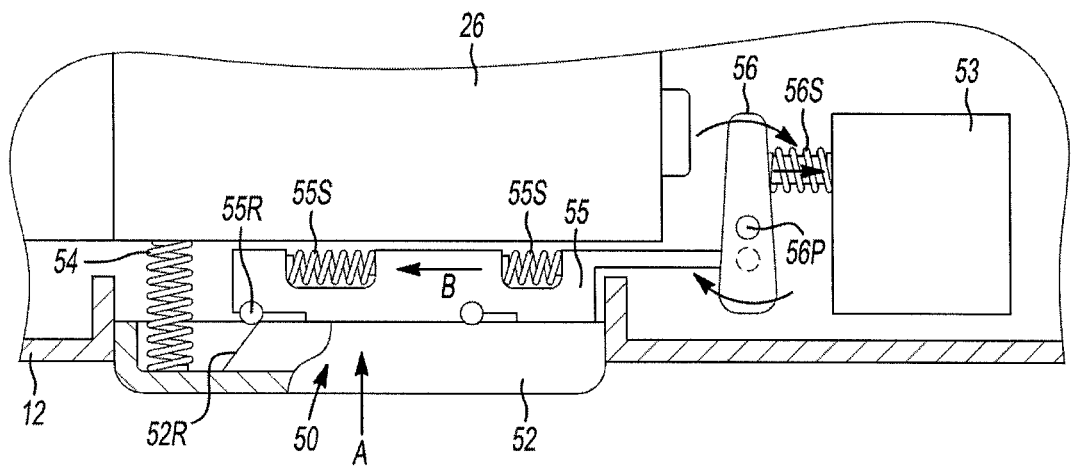
FIG. 16 is a fragmentary section view depicting an alternative trigger switch assembly.

FIG. 16 illustrates an alternative trigger switch assembly 50, where like numerals refer to like parts. Elongated casing 52 is preferably captured by the first housing portion 12 so that it can only slide in one particular direction A. Elongated casing 52 may have ramps 52R. Ramps 52R engage cams 55R on a sliding link 55. Sliding link 55 is captured by the first housing portion 12 so that it can preferably only slide in along a direction B substantially perpendicular to direction A.

Sliding link 55 is preferably rotatably attached to rotating link 56. Rotating link 56 may be rotatably attached to the first housing portion 12 via a post 56P.

Accordingly, when the user moves elongated casing 52 along direction A, ramps 52R move cams 55R (and thus sliding link 55) along direction B. This causes rotating link 56 to rotate and make contact with momentary switch 53, powering up the screwdriver 10.

Preferably, elongated casing 52 contacts springs 54 which bias elongated casing 52 in a direction opposite to direction A. Similarly, sliding link 55 may contact springs 55S which bias sliding link 55 in a direction opposite to direction B. Also, rotating link 56 may contact a spring 56S that biases rotating link 56 away from momentary switch 53.

Persons skilled in the art will recognize that, because switch 53 can be disposed away from elongated casing 52, motor 26 can be provided adjacent to elongated casing 52 and sliding link 55, allowing for a more compact arrangement.

Persons skilled in the art will also recognize that, instead of having the user activating a discrete trigger assembly 50 in order to power up screwdriver 10, screwdriver 10 can have an inherent switch assembly. FIGS. 17A-17B illustrate one such an alternative switch assembly, where like numerals refer to like parts.

Referring now to FIGS. 17A-17B for this embodiment, a power train assembly 49 as shown in FIG. 4, which includes motor 26, the output member 11 and/or any transmission there between, is preferably encased in a housing 71 and made to translate axially inside the first housing portion 12. A spring 72 of adequate stiffness biases the drivetrain assembly 71 forward in the tool housing. A momentary push-button switch 73 is placed in axial alignment with the drivetrain assembly 71. When the tool is applied to a fastener, a bias load is applied along the axis of the tool and the drivetrain assembly 71 translates rearward compressing the spring and contacting the pushbutton. In an alternative example, the drivetrain assembly remains stationary but a collar 74 surrounding the bit is made to translate axially and actuate a switch. Other arrangements for actuating the switch are also contemplated.

When the pushbutton 73 is actuated (i.e., placed in a closed state), the battery 28 is connected via power-regulating circuits to the rotational motion sensor, the controller 24, and other support electronics. With reference to FIG. 7, the controller 24 immediately turns on a bypass switch 34 (e.g., FET). This enables the tool electronics to continue receiving power even after the pushbutton is released. When the tool is disengaged from the fastener, the spring 72 again biases the drivetrain assembly 71 forward and the pushbutton 73 is released. In an exemplary embodiment, the controller 24 will remain powered for a predetermined amount of time (e.g., 10 seconds) after the pushbutton 73 is released. During this time, the tool may be applied to the same or different fastener without the tool being powered down. Once the pushbutton 73 has released for the predetermined amount of time, the controller 24 will turn off the bypass switch 34 and power down the tool. It is preferable that there is some delay between a desired tool shut down and powering down the electronics. This gives the driver circuit time to brake the motor to avoid motor coasting. In the context of the embodiment described in FIG. 7, actuation of pushbutton 73 also serves to reset (i.e., set to zero) the angular position. Powering the electronics may be controlled by the pushbutton or with a separate switch. Batteries which are replaceable and/or rechargeable serve as the power source in this embodiment, although the concepts disclosed herein as also applicable to corded tools.

The operational state of the tool may be conveyed to the tool operator by a light emitting diode 35 (LED) that will be illuminated while the tool is powered-up. The LED 35 may be used to indicate other tool conditions. For example, a blinking LED 35 may indicate when a current level has been exceeded or when the battery is low. In an alternative arrangement, LED 35 may be used to illuminate a work surface.

In another alternative arrangement (as shown in FIG. 21), multiple LEDs may be used to indicate the direction and speed of tool operation. For example, three side-by-side LEDs 35 can be lit consecutively one at a time from left to right when the output member 11 is rotating in a clockwise direction and from right to left when output member 11 is rotating in a counterclockwise direction. The duration of illumination, or blink rate, may indicate the speed of operation, where the longer each LED is lit, the slower the operation speed. When the direction of rotation of output member 11 is reversed, the LEDs 35 should to reflect this transition. For example, the LEDs 35 could all be lit simultaneously for a brief period when the tool's rotation passes back through the starting or reference point to indicate the change. If the user does nothing else, the LEDs 35 might turn off or return to showing battery life or some other status. If the user continues to rotate the tool in the opposite direction, the LEDs 35 would resume consecutive illumination and blink rate based on direction and speed of rotation. Other alternative embodiments could include more or fewer LEDs used as described above.

In another alternative arrangement, the direction of rotation of output member 11 might be indicated by one LED arrow. The arrow may change color based on speed, for example, from green to yellow to orange to red. The speed could also be indicated by the arrow's blink rate.

In this embodiment, the tool may be powered up but not engaged with a fastener. Accordingly, the controller may be further configured to drive the output member only when the pushbutton switch 73 is actuated. In other words, the output member is driven only when the tool is engaged with a fastener and a sufficient bias force is applied to the drivetrain assembly. Control algorithm may allow for a lesser bias force when a fastener is being removed. For instance, the output member may be driven in a reverse direction when a sufficient bias load is applied to the drivetrain assembly as described above. Once the output member begins rotating, it will not shut off (regardless of the bias force) until some forward rotation is detected. This will allow the operator to loosen a screw and lower the bias load applied as the screw reverses out of the material without having the tool shut off because of a low bias force. Other control schemes that distinguish between a forward operation and a reverse operation are also contemplated by this disclosure.

Figure 17C:
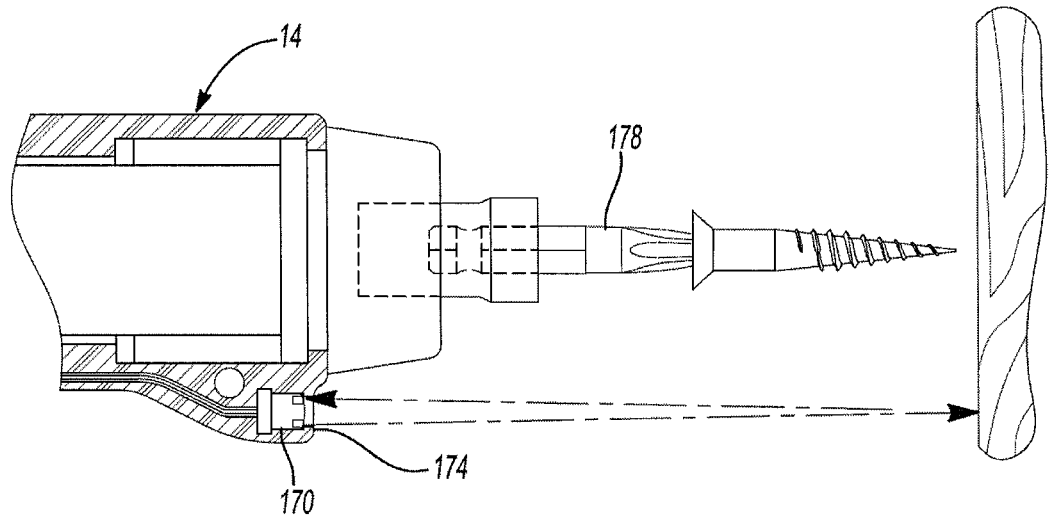

Non-contacting sensing methods may also be used to control operation of the tool. For example, a non-contact sensor 170 may be disposed on the forward facing surface 174 of the tool adjacent to the bit 178 as shown in FIG. 17C. The non-contact sensor 170 may be used to sense when the tool is approaching, being applied to, or withdrawing from a workpiece. Optic or acoustic sensors are two exemplary types of non-contact sensors. Likewise, an inertial sensor, such as an accelerometer, can be configured to sense the relative position or acceleration of the tool. For example, an inertial sensor can detect linear motion of the tool towards or away from a workpiece along the longitudinal axis of the tool. This type of motion is indicative of engaging a workpiece with the tool or removing the tool after the task is finished. These methods may be more effective for sensing joint completion and/or determining when to turn the tool off.

Combinations of sensing methods are also contemplated by this disclosure. For example, one sensing method may be used for startup while another is used for shutdown. Methods that respond to force applied to the workpiece may be preferred for determining when to start up the tool, while methods that sense the state of the fastener or movement of the tool away from the application may be preferred for determining when to modify tool output (e.g., shut down the tool).

Components residing in the housing of the screwdriver 10 include a rotational rate sensor 22, which may be spatially separated in a radial direction from the output member as well as a controller 24 electrically connected to the rotational rate sensor 22 and a motor 26 as further illustrated schematically in FIG. 7. A motor drive circuit 25 enables voltage from the battery to be applied across the motor in either direction. The motor 26 in turn drivably connects through a transmission (not shown) to the output member 11. In the exemplary embodiment, the motor drive circuit 25 is an H-bridge circuit arrangement although other arrangements are contemplated. The screwdriver 10 may also include a temperature sensor 31, a current sensor 32, a tachometer 33 and/or a LED 35. Although a few primary components of the screwdriver 10 are discussed herein, it is readily understood that other components may be needed to construct the screwdriver.

In an exemplary embodiment, rotational motion sensor 22 is further defined as a gyroscope. The operating principle of the gyroscope is based on the Coriolis effect. Briefly, the rotational rate sensor is comprised of a resonating mass. When the power tool is subject to rotational motion about the axis of the spindle, the resonating mass will be laterally displaced in accordance with the Coriolis effect, such that the lateral displacement is directly proportional to the angular rate. It is noteworthy that the resonating motion of the mass and the lateral movement of the mass occur in a plane which is oriented perpendicular to the rotational axis of the rotary member. Capacitive sensing elements are then used to detect the lateral displacement and generate an applicable signal indicative of the lateral displacement. An exemplary rotational rate sensor is the ADXRS150 or ADSRS300 gyroscope device commercially available from Analog Devices. It is readily understood that accelerometers, compasses, inertial sensors and other types of rotational motion sensors are contemplated by this disclosure. It is also envisioned that the sensor as well as other tool components may be incorporated into a battery pack or any other removable pieces that interface with the tool housing.

During operation, the rotational motion sensor 22 monitors rotational motion of the sensor with respect to the longitudinal axis of the output member 11. A control module implemented by the controller 24 receives input from the rotational motion sensor 22 and drives the motor 26 and thus the output member 11 based upon input from the rotational motion sensor 22. For example, the control module may drive the output member 11 in the same direction as the detected rotational motion of the tool. As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor, where code, as used above, may include software, firmware, and/or microcode, and may refer to programs, routines, functions, classes, and/or objects.

Functionality for an exemplary control scheme 80 is further described below in relation to FIG. 8A. During tool operation, angular displacement may be monitored by the controller 24 based upon input received from the rotational motion sensor 22. In step 81, a starting or reference point (θ) is initialized to zero. Any subsequent angular displacement of the tool is then measured in relation to this reference. In an exemplary embodiment, the control scheme is implemented as computer executable instructions residing in a memory and executed by a processor of the controller 24.

Figure 20:
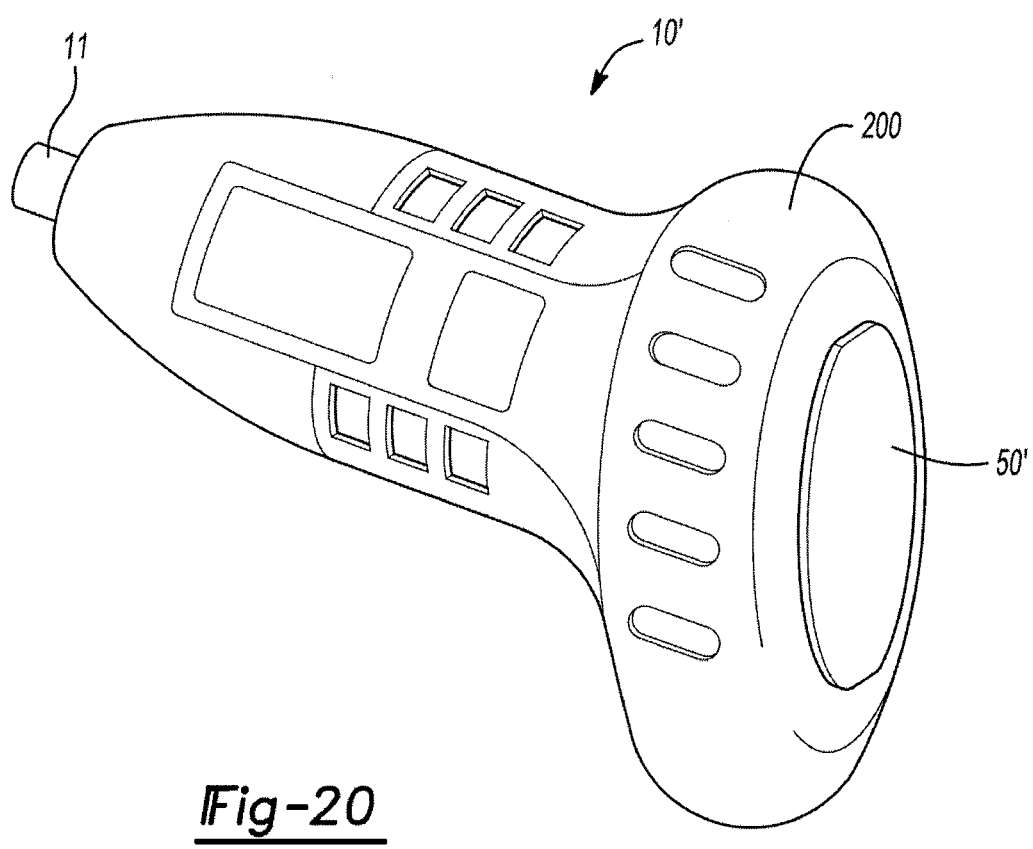
FIG. 20 is a perspective view of a second exemplary power screwdriver.

At any point during operation, the user may wish to reset the starting or reference point (θ). For example, the user's wrist may be rotated 40° clockwise, and the user wants to reverse the direction of the tool's operation. Instead of rotating back through the reference point and continuing to rotate to the left, the user may reset the reference point to be the current position (in this example, 40° clockwise). Any subsequent counterclockwise rotation from the new reference point will reverse the direction of the rotation of output member 11. In the second exemplary embodiment (as shown in FIG. 20), where holding in the trigger switch assembly 50 is how the tool remains in a powered-up state, releasing the trigger switch assembly 50 would reset the reference point. In an alternate embodiment, pressing the dedicated zero button 210 (as shown in FIG. 21) would reset the reference point. Persons skilled in the art will recognize that other implementations can be envisioned, such as requiring the zero button 210 to be pressed and held for a short period of time in order to prevent accidental zeroing.

Angular displacement of the tool is then monitored at step 82. In the exemplary embodiment, the angular displacement is derived from the rate of angular displacement over time or angular velocity ($\omega_{TOOL}$) as provided by the gyroscope. While the rotational rate sensor described above is presently preferred for determining angular displacement of the tool, it is readily understood that this disclosure is not limited to this type of sensor. On the contrary, angular displacement may be derived in other manners and/or from other types of sensors. It is also noted that the signal from any rotational rate sensor can be filtered in the analog domain with discrete electrical components and/or digitally with software filters.

In this proposed control scheme, the motor is driven at different rotational speeds depending upon the amount of rotation. For example, the angular displacement is compared at 84 to an upper threshold. When the angular displacement exceeds an upper threshold $\theta_{UT}$ (e.g., 30° of rotation), then the motor is driven at full speed as indicated at 85. The angular displacement is also compared at 86 to a lower threshold. When the angular displacement is less than the upper threshold but exceeds a lower threshold $\theta_{LT}$ (e.g., 5° of rotation), then the motor is driven at half speed as indicated at 87. It is readily understood that the control scheme may employ more or less displacement thresholds as well as drive the motor at other speeds.

Angular displacement continues to be monitored at step 82. Subsequent control decisions are based on the absolute angular displacement in relation to the starting point as shown at 83. When the angular displacement of the tool remains above the applicable threshold, then the operating speed of the motor is maintained. In this way, continuous operation of the tool is maintained until the tool is returned to its original position. In the exemplary embodiment, returning the tool to its original position means that the user returns the tool to within 10° to 15° of the original position, for example. This creates a range around the reference point that allows for a small margin of user error. The user is not required to find the exact reference point that was set. On the other hand, when the tool operator rotates the tool in the opposite direction and angular displacement of the tool drops below (is less than) the lower threshold, then the output of the tool is modified at 190. In an exemplary embodiment, the voltage applied to the motor is discontinued at 190, thereby terminating operation of the tool. In an alternative embodiment, the speed at which the motor is driven is reduced to some minimal level that allows for spindle rotation at no load. Other techniques for modifying output of the tool are also envisioned. Threshold values may include hysteresis; that is, the lower threshold is set at one value (e.g. six degrees) for turning on the motor but set at a different value (e.g., four degrees) for turning off the motor, for example. It is also to be understood that only the relevant steps of the methodology are discussed in relation to FIG. 8A, but that other functionality may be needed to control and manage the overall operation of the system.

Figure 8A:
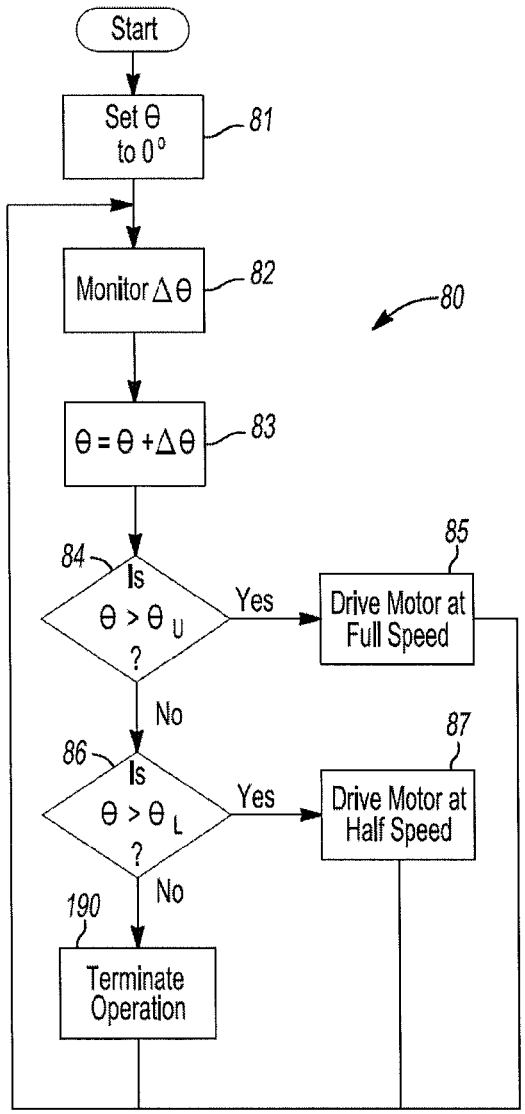
FIGS. 8A-8C are flow charts for exemplary control schemes for the power screwdriver.
Figure 8B:
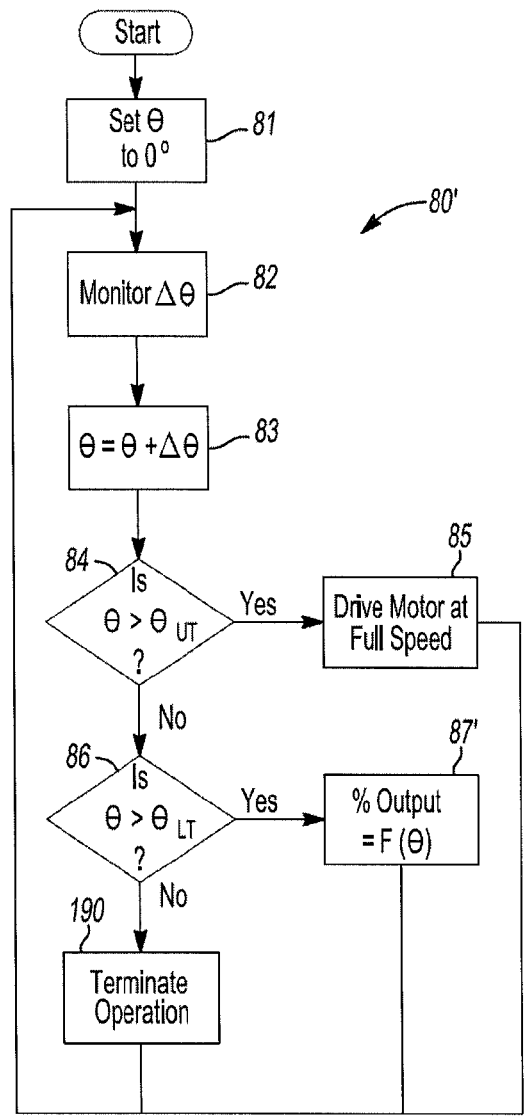

A variant of this control scheme 80' is shown in FIG. 8B. When the angular displacement is less than the upper threshold but exceeds a lower threshold $\theta_{LT}$ (e.g., 5° of rotation), then the motor speed may be set generally as a function of the angular displacement as indicated at 87'. More specifically, the motor speed may be set proportional to the full speed. In this example, the motor speed is derived from a linear function. It is also noted that more complex functions, such as quadratic, exponential or logarithmic functions, may be used to control motor speed. In another embodiment, the motor speed could be proportional to the displacement, velocity, acceleration, or a combination thereof (as shown in FIG. 8B, step 87').

In either control scheme described above, direction of tool rotation may be used to control the rotational direction of the output member. In other words, a clockwise rotation of the tool results in a clockwise rotation of the output member, and a counterclockwise rotation of the tool results in a counterclockwise rotation of the output member. Alternatively, the tool may be configured with a switch that enables the operator to select the rotational direction of the output member.

Figure 8C:
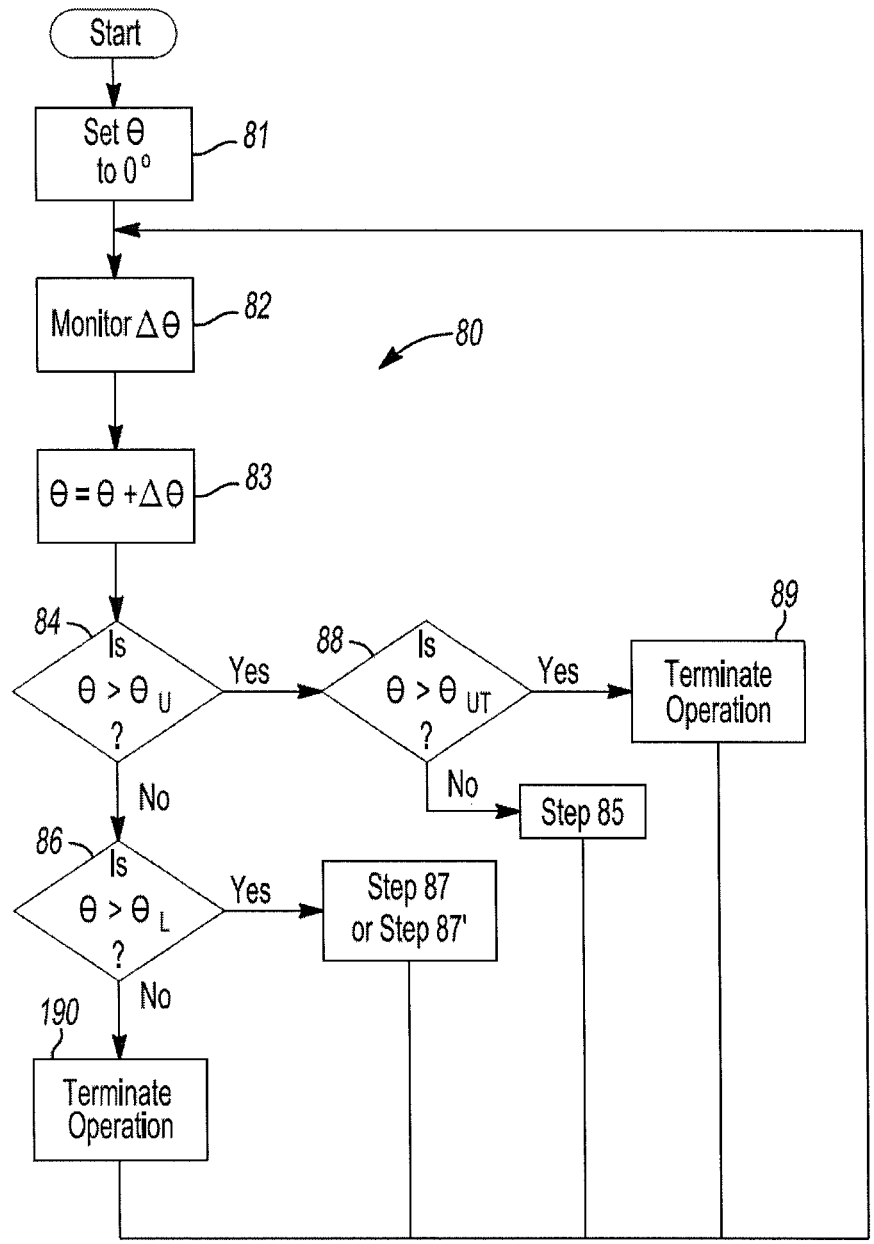

Persons skilled in the art will recognize that rotational motion sensor 22 can be used in diverse ways. For example, the motion sensor 22 can be used to detect fault conditions and terminate operation. One such scheme is shown in FIG. 8C where, if the angular displacement is larger than the upper threshold $\theta_U$ (step 86), it could be advantageous to check whether the angular displacement exceeds on a second upper threshold $\theta_{OT}$ (step 88). If such threshold is exceeded, then operation of screwdriver 10 can be terminated (step 89). Such arrangement is important in tools that should not be inverted or put in certain orientations. Examples of such tools include table saws, power mowers, etc.

Similarly, operation of screwdriver 10 can be terminated if motion sensor 22 detects a sudden acceleration, such as when a tool is dropped.

Alternatively, the control schemes in FIGS. 8A-8C can be modified by monitoring angular velocity of output member 11 about the longitudinal axis 8 instead of angular displacement. In other words, when the angular velocity of rotation exceeds an upper threshold, such as 100°/second, then the motor is driven at full speed, whereas if the angular velocity is lower than the upper threshold but exceeds a lower threshold, such as 50°/second, then the motor is driven at half speed.

Alternatively, the control schemes shown in FIGS. 8A-8C can be modified by monitoring angular acceleration instead of angular velocity. In other words, when the angular acceleration of rotation exceeds an upper threshold, such as 100°/second per second, then the motor is driven at full speed, whereas if the angular acceleration is lower than the upper threshold but exceeds a lower threshold, such as 50°/second per second, then the motor is driven at half speed. Alternatively, a combination of displacement, velocity, and/or acceleration could determine the control scheme.

Figure 18:
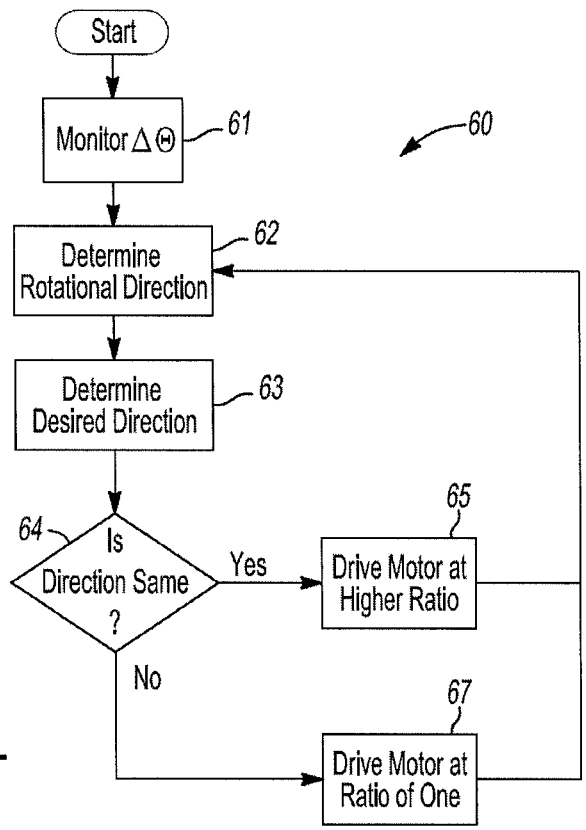
FIG. 18 is a flowchart for another exemplary control scheme for the tool.

With reference to FIG. 18, a ratcheting control scheme 60 is also contemplated by this disclosure. During tool operation, the controller monitors angular displacement of the tool at 61 based upon input received from the rotational motion sensor 22. From angular displacement, the controller is able to determine the direction of the displacement at 62 and drive the motor 26 to simulate a ratchet function as further described below.

In this proposed control scheme, the controller must also receive an indication from the operator at 63 as to which direction the operator desires to ratchet. In an exemplary embodiment, the screwdriver 10 may be configured with a switch that enables the operator to select between forward and reverse ratchet directions. Other input mechanisms are also contemplated.

When the forward ratchet direction is selected by the operator, the controller drives the motor in the following manner. When the operator rotates the tool clockwise, the output member is driven at a higher ratio than the rotation experienced by the tool. For example, the output member may be driven one or more full revolutions for each quarter turn of the tool by the operator. In other words, the output member is rotated at a ratio greater than one when the direction of rotational motion is the same as a user selected ratcheting direction as indicated at 65. It may not be necessary for the user to select a ratchet direction. Rather the control may make a ratcheting direction decision based on a parameter, for example, an initial rotation direction is assumed the desired forward direction.

On the other hand, when the operator rotates the tool counter clockwise, the output member is driven at a one-to-one ratio. Thus the output member is rotated at a ratio equal to one when the direction rotational motion is the opposite the user selected ratcheting direction as indicated at 67. In the case of the screwdriver, the bit and screw would remain stationary as the user twists the tool backward to prepare for the next forward turn, thereby mimicking a ratcheting function.

The control schemes set forth above can be further enhanced by the use of multiple control profiles. Depending on the application, the tool operator may prefer a control curve that gives more speed or more control. FIG. 9 illustrates three exemplary control curves. Curve A is a linear control curve in which there is a large variable control region. If the user does not need fine control for the application and simply wants to run an application as fast as possible, the user would prefer curve B. In this curve, the tool output ramps up and obtains full output quickly. If the user is running a delicate application, such as seating a brass screw, the user would prefer curve C. In this curve, obtaining immediate power is sacrificed to give the user a larger control region. In the first part of the curve, output power changes slowly; whereas, the output power changes more quickly in the second part of the curve. Although three curves are illustrated, the tool may be programmed with two or more control curves.

In one embodiment, the tool operator may select one of a set number of control curves directly with an input switch. In this case, the controller applies the control curve indicated by the input switch until the tool operator selects a different control curve.

Figure 9A:
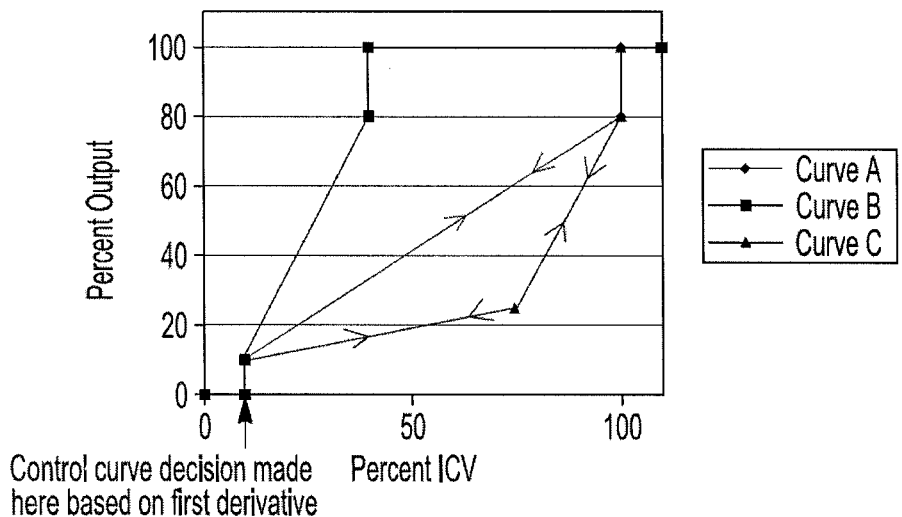
FIGS. 9A-9E are charts illustrating different control curves that may be employed by the power screwdriver.

In an alternative embodiment, the controller of the tool can select an applicable control curve based on an input control variable (ICV) and its derivative. Examples of ICVs include displacement, velocity, and acceleration. The motor speed from the selected curve may be determined by either the same or some other variable. For example, the controller may select the control curve based on distance a trigger has traveled and the speed at which the user actuates the trigger switch. In this example, the selection of the control curve is not made until the trigger has traveled some predetermined distance (e.g., 5% of the travel range as shown in FIG. 9A) as measured from a starting position.

Once the trigger has traveled the requisite distance, the controller computes the speed of the trigger and selects a control curve from a group of control curves based on the computed speed. If the user simply wants to drive the motor as quick as possible, the user will tend to pull the trigger quickly. For this reason, if the speed of trigger exceeds some upper speed threshold, the controller infers that the user wants to run the motor as fast as possible and selects an applicable control curve (e.g., Curve B in FIG. 9A). If the user is working on a delicate application and requires more control, the user will tend to pull the trigger more slowly. Accordingly, if the speed of trigger is below some lower speed threshold, the controller infers the user desires more control and selects a different control curve (e.g., Curve C in FIG. 9A). If the speed of the trigger falls between the upper and lower thresholds, the controller may select another control curve (e.g., Curve A in FIG. 9A). Curve selection could be (but is not limited to being) performed with every new trigger pull, so the user can punch the trigger to run the screw down, release, and obtain fine seating control with the next slower trigger pull.

The controller then controls the motor speed in accordance with the selected control curve. In the example above, the distance travelled by the trigger correlates to a percent output power. Based on the trigger distance, the controller will drive the motor at the corresponding percent output in accordance with the selected control curve. It is noted that this output could be motor pulse width modulation, as in an open loop motor control system, or it could be motor speed directly, as in a closed loop motor control system.

In another example, the controller may select the control curve based on a different input control variable, such as the angular distance the tool has been rotated from a starting point and its derivative, i.e., the angular velocity at which the tool is being rotated. Similar to trigger speed, the controller can infer that the user wants to run the motor as fast as possible when the tool is rotated quickly and infer that the user wants to run the motor slower when the tool is being rotated slowly. Thus, the controller can select and apply a control curve in the manner set forth above. In this example, the percentage of the input control variable is computed in relation to a predefined range of expected rotation (e.g., +/−180 degrees). Selecting an applicable control curve based on another type of input control variable land its derivative is also contemplated by this disclosure.

Figure 9B:
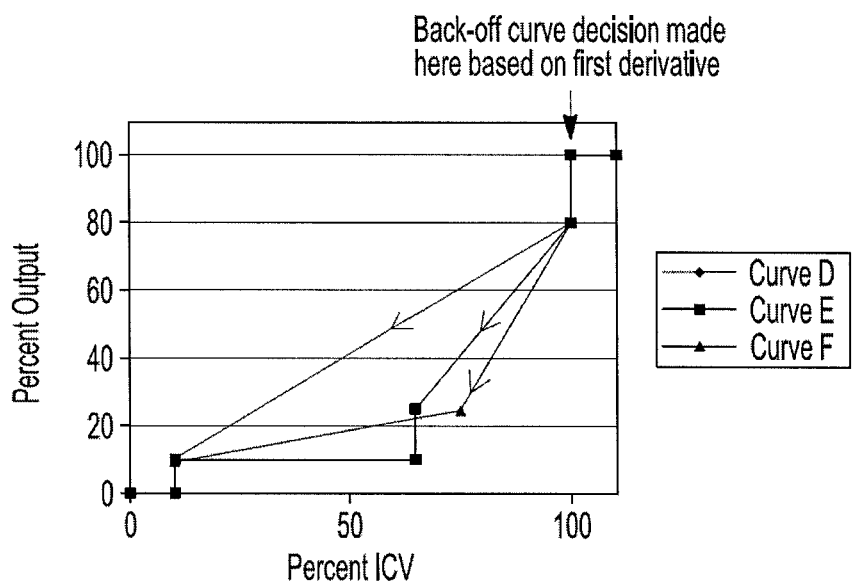

It may be beneficial to monitor the input control variable and select control curves at different points during tool operation. For example, the controller may compute trigger speed and select a suitable control curve after the trigger has been released or otherwise begins traveling towards its starting position. FIG. 9B illustrates three exemplary control curves that can be employed during such a back-off condition. Curve D is a typical back off curve which mimics the typical ramp up curve, such as Curve A. In this curve, the user passes through the full range of analog control before returning to trigger starting position. Curve E is an alternative curve for faster shutoff. If the trigger is released quickly, the controller infers that the user simply wants to shut the tool off and allows the user to bypass most of the variable speed region. If the user backs off slowly, the controller infers that the user desires to enter the variable speed region. In this case, the controller may select and apply Curve F to allow the user better finish control, as would be needed to seat a screw. It is envisioned that the controller may monitor the input control variable and select an applicable control curve based on other types of triggering events which occur during tool operation.

Figure 9C:
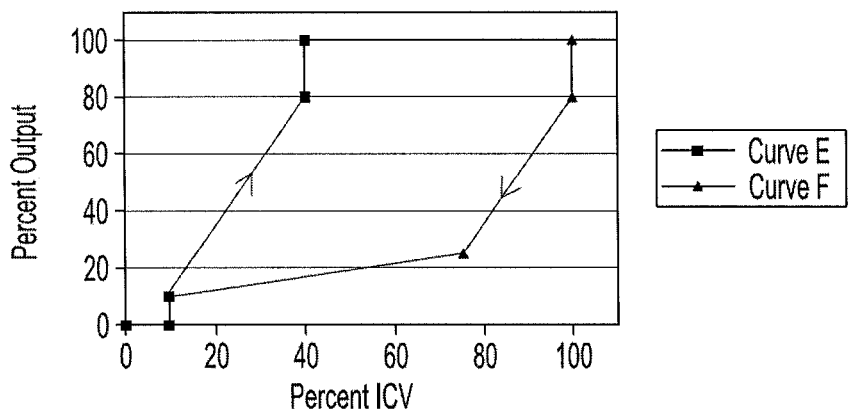

Ramp up curves may be combined with back off curves to form a single selectable curve as shown in FIG. 9C. In an exemplary application, the user wishes to use the tool to drive a long machine screw and thus selects the applicable control curves using the input switch as discussed above. When the user pulls the trigger, the controller applies Curve B to obtain full tool output quickly. When the user has almost finished running down the screw, the user releases the trigger and the controller applies Curve F, thereby giving the user more control and the ability to seat the screw to the desired tightness.

Figure 9D:
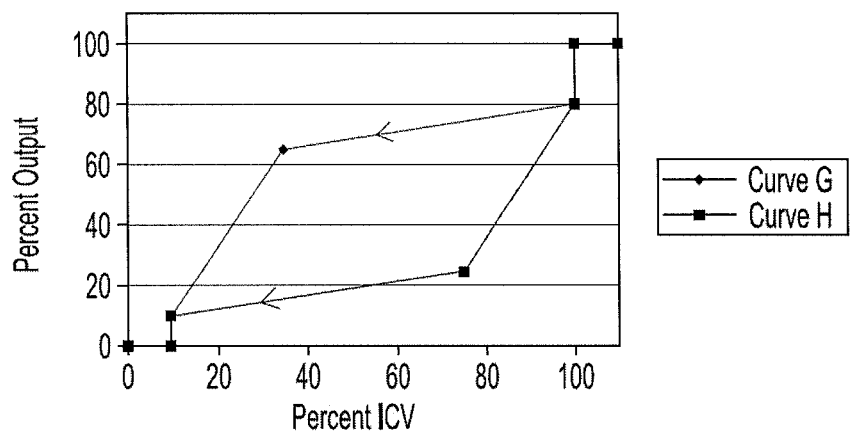

Selection of control curves may be based on the input control variable in combination with other tool parameters. For example, the controller may monitor output torque using known techniques such as sensing current draw. With reference to FIG. 9D, the controller has sensed a slow trigger release, thereby indicating the user desires variable speed for finish control. If the controller further senses that output torque is high, the controller can infer that the user needs more output power to keep the fastener moving (e.g., a wood screw application). In this case, the controller selects Curve G, where the control region is shifted upward to obtain a usable torque. On the other hand, if the controller senses that output torque is low, the controller can infer that additional output power is not needed (e.g., a machine screw application) and thus select Curve H. Likewise, the controller may select from amongst different control curves at tool startup based on the sensed torque. Tool parameters other than torque may also be used to select a suitable control curve.

Figure 9E:
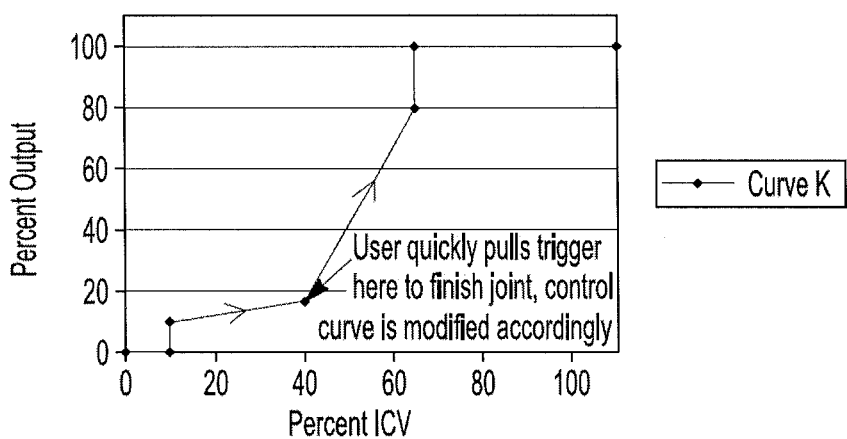

Selection of control curves can also be based on a second derivative of the input control variable. In an exemplary embodiment, the controller can continually compute the acceleration of the trigger. When the acceleration exceeds some threshold, the controller may select a different control curve. This approach is especially useful if the tool has already determined a ramp up or back off curve but the user desires to change behavior mid curve. For example, the user has pulled the trigger slowly to allow a screw to gain engagement with a thread. Once engaged, the user punches the trigger to obtain full output. Since the tool always monitors trigger acceleration, the tool senses that the user is finished with variable speed control and quickly sends the tool into full output as shown in FIG. 9E.

Again, trigger input is used as an example in this scenario, but it should be noted that any user input control, such as a gesture, could be used as the input control variable. For example, sensor 22 can detect when the user shakes a tool to toggle between control curves or even operation modes. For example, a user can shake a sander to toggle between a rotary mode and a random orbit mode. In the examples set forth above, the controller controls the motor speed in accordance with the same input control variable as is used to select the control curve. It is envisioned that the controller may control the motor speed with an input control variable that differs from the input control variable used to select the control curve. For example, motor speed may be set based on displacement of the trigger; whereas, the control curve is selected in accordance with the velocity at which the trigger is actuated.

Referring to FIG. 7, the screwdriver 10 includes a current sensor 32 to detect current being delivered to the motor 26. It is disadvantageous for the motor of the tool to run at high current levels for a prolonged period of time. High current levels are typically indicative of high torque output. When the sensed current exceeds some predefined threshold, the controller is configured to modify tool output (e.g., shut down the tool) to prevent damage and signal to the operator that manually applied rotation may be required to continue advancing the fastener and complete the task. The tool may be further equipped with a spindle lock. In this scenario, the operator may actuate the spindle lock, thereby locking the spindle in fixed relation to the tool housing. This causes the tool to function like a manual screwdriver.

Figure 10:
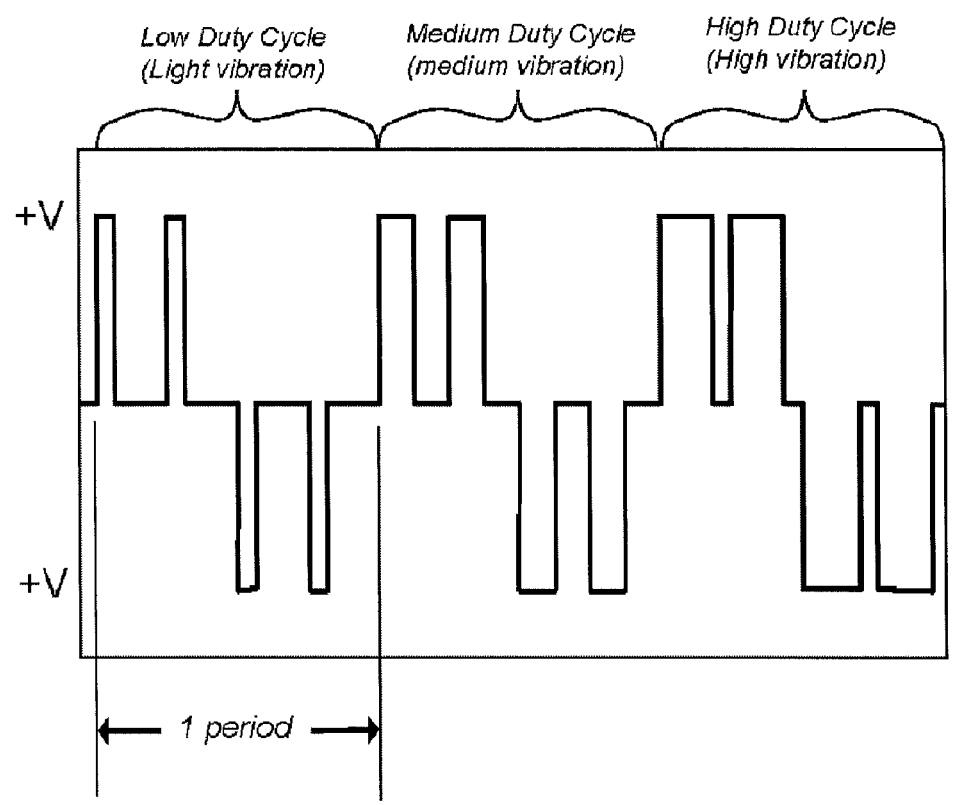
FIG. 10 is a diagram depicting an exemplary pulsing scheme for providing haptic feedback to the tool operator.

For such inertia-controlled tools, there may be no indication to the user that the tool is operational, for example, when the user depresses the trigger switch assembly 50 but does not rotate the tool. Accordingly, the screwdriver 10 may be further configured to provide a user-perceptible output when the tool is operational. Providing the user with haptic feedback is one example of a user-perceptible output. The motor driven circuit 25 may be configured as an H-bridge circuit as noted above and in FIG. 7. The H-bridge circuit is used to selectively open and close pairs of field effect transistors (FETs) to change the current flow direction and therefore the rotational direction of the motor. By quickly transitioning back and forth between forward and reverse, the motor can be used to generate a vibration perceptible to the tool operator. The frequency of a vibration is dictated by the time span for one period and the magnitude of a vibration is dictated by the ratio of on time to off time as shown in FIG. 10. Other schemes for vibrating the tool also fall within the broader aspects of this disclosure.

Within the control schemes presented in FIGS. 8A-8C, the H-bridge circuit 25 (as seen in FIG. 7) may be driven in the manner described above before the angular displacement of the tool reaches the lower threshold. Consequently, the user is provided with haptic feedback when the spindle is not rotating. It is also envisioned that user may be provided haptic feedback while the spindle is rotating. For example, the positive and negative voltage may be applied to the motor with an imbalance between the voltages such that the motor will advance in either a forward or reverse direction while still vibrating the tool. It is understood that haptic feedback is merely one example of a perceptible output and other types of outputs also are contemplated by this disclosure.

Vibrations having differing frequencies and/or differing magnitudes can also be used to communicate different operational states to the user. For example, the magnitude of the pulses can be changed proportionally to speed to help convey where in a variable-speed range the tool is operating. So as not to limit the total tool power, this type of feedback may be dropped out beyond some variable speed limit (e.g., 70% of maximum speed). In another example, the vibrations may be used to warn the operator of a hazardous tool condition. Lastly, the haptic feedback can be coupled with other perceptible indicators to help communicate the state of the tool to the operator. For instance, a light on the tool may be illuminated concurrently with the haptic feedback to indicate a particular state.

Additionally, haptic feedback can be used to indicate that the output member has rotated 360°, or that a particular desired torque setting has been achieved.

In another aspect of this invention, an automated method is provided for calibrating a gyroscope residing in the screwdriver 10. Gyroscopes typically output a sensed-analog voltage (Vsense) that is indicative of the rate of rotation. Rate of rotation can be determined by comparing the sensed voltage to a reference voltage (e.g., rate=(Vsense−Vref)/scale factor). With some gyroscopes, this reference voltage is output directly by the gyroscope. In other gyroscopes, this reference voltage is a predetermined level (i.e., gyroscope supply voltage/2) that is set as a constant in the controller. When the sensed voltage is not equal to the reference voltage, rotational motion is detected. When the sensed voltage is equal to the reference voltage, no motion is occurring. In practice, there is an offset error (ZRO) between the two voltages (i.e., ZRO=Vsense−Vref). This offset error can be caused by different variants, such as mechanical stress on a gyroscope after mounting to a PCT or an offset error in the measuring equipment. The offset error is unique to each gyroscope but should remain constant over time. For this reason, calibration is often performed after a tool is assembled to determine the offset error. The offset error can be stored in memory and used when calculating the rotational rate (i.e., rate-(Vsense−Vref−ZRO/scale).

Figure 11:
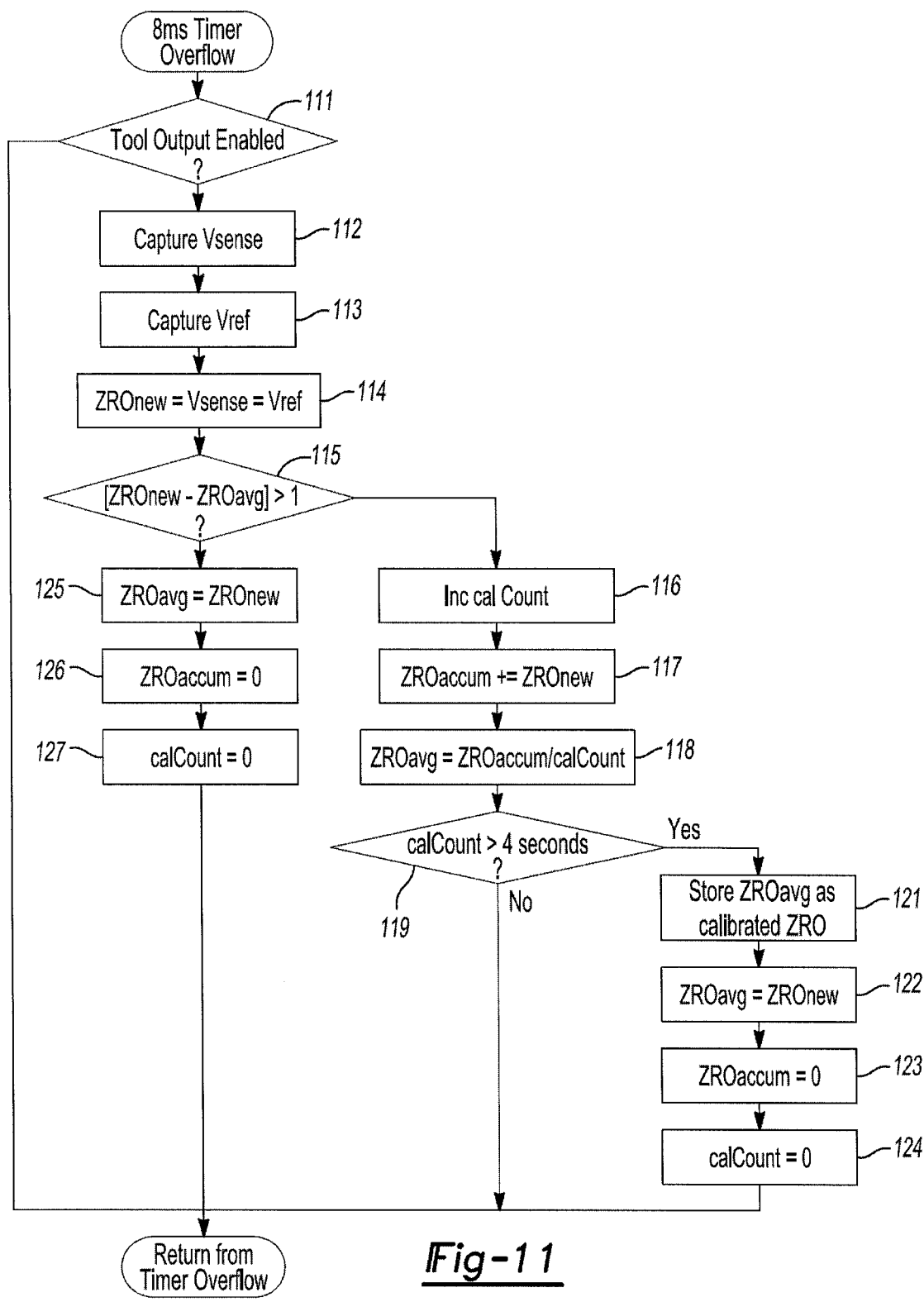
FIG. 11 is a flow chart depicting an automated method for calibrating a gyroscope residing in the power screwdriver.

Due to changes in environmental conditions, it may become necessary to recalibrate the tool during the course of tool use. Therefore, it is desirable for the tool to be able to recalibrate itself in the field. FIG. 11 illustrates an exemplary method for calibrating the offset error of the gyroscope in the tool. In an exemplary embodiment, the method is implemented by computer-executable instructions executed by a processor of the controller 24 in the tool.

First, the calibration procedure must occur when the tool is stationary. This is likely to occur once an operation is complete and/or the tool is being powered down. Upon completing an operation, the tool will remain powered on for a predetermined amount of time. During this time period, the calibration procedure is preferably executed. It is understood that the calibration procedure may be executed at other times when the tool is or is likely to be stationary. For example, the first derivative of the sensed voltage measure may be analyzed to determine when the tool is stationary.

The calibration procedure begins with a measure of the offset error as indicated at 114. After the offset error is measured, it is compared to a running average of preceding offset error measurements (ZROavg). The running average may be initially set to the current calibration value for the offset error. The measured offset error is compared at 115 to a predefined error threshold. If the absolute difference between the measured offset error and the running average is less than or equal to the predefined offset error threshold, the measured offset error may be used to compute a newly-calibrated offset error. More specifically, the measurement counter (calCount) may be incremented at 116 and the measured offset error is added to an accumulator (ZROaccum) at 117. The running average is then computed at 118 by dividing the accumulator by the counter. A running average is one exemplary way to compute the newly-calibrated offset error.

Next, a determination is made as to whether the tool is stationary during the measurement cycle. If the offset error measurements remain constant or nearly constant over some period of time (e.g., 4 seconds) as determined at 119, the tool is presumed to be stationary. Before this time period is reached, additional measurements of the offset error are taken and added to the running average so long as the difference between each offset error measurement and the running average is less than the offset error threshold. Once the time period is reached, the running average is deemed to be a correct measurement for the offset error. The running average can be stored in memory at 121 as the newly-calibrated offset error and subsequently used by the controller during the calculations of the rotational rate.

When the absolute difference between the measured offset error and the running average exceeds the predefined offset error threshold, the tool must be rotating. In this case, the accumulator and measurement counter are reset as indicated at steps 126 and 127. The calibration procedure may continue to execute until the tool is powered down or some other trigger ends the procedure.

To prevent sudden erroneous calibrations, the tool may employ a longer-term calibration scheme. The method set forth above determines whether or not there is a need to alter the calibration value. The longer-term calibration scheme would use a small amount of time (e.g., 0.25 s) to perform short-term calibrations, since errors would not be critical if no rotational motion is sensed in the time period. The averaged ZRO would be compared to the current calibration value. If the averaged ZRO is greater than the current calibration value, the controller would raise the current calibration value. If the averaged ZRO is less than the current calibration value, the controller would lower the current calibration value. This adjustment could either be incremental or proportional to the difference between the averaged value and the current value.

Due to transmission backlash, the tool operator may experience an undesired oscillatory state under certain conditions. While the gears of a transmission move through the backlash, the motor spins quickly, and the user will experience like reactionary torque. As soon as the backlash is taken up, the motor suddenly experiences an increase in load as the gears tighten, and the user will quickly feel a strong reactionary torque as the motor slows down. This reactionary torque can be strong enough to cause the tool to rotate in the opposite direction as the output spindle. This effect is increased with a spindle lock system. The space between the forward and reverse spindle locks acts similarly to the space between gears, adding even more backlash into the system. The greater the backlash, the greater amount of time the motor has to run at a higher speed. The higher a speed the motor achieves before engaging the output spindle, the greater the reactionary torque, and the greater the chance that the body of the tool will spin in the opposite direction.

While a tool body's uncontrolled spinning may not have a large effect on tool operation for trigger-controlled tools, it may have a prominent and detrimental effect for rotation-controlled tools. If the user controls tool output speed through the tool-body rotation, any undesired motion of the tool body could cause an undesired output speed. In the following scenario, it can even create an oscillation effect. The user rotates the tool clockwise in an attempt to drive a screw. If there is a great amount of backlash, the motor speed will increase rapidly until the backlash is taken up. If the user's grip is too relaxed at this point, the tool will spin uncontrolled in the counterclockwise direction. If the tool passes the zero rotation point and enters into negative rotation, the motor will reverse direction and spin counterclockwise. The backlash will again be taken up, eventually causing the tool body to spin uncontrolled in the clockwise direction. This oscillation or oscillatory state may continue until tool operation ceases.

Figure 15:
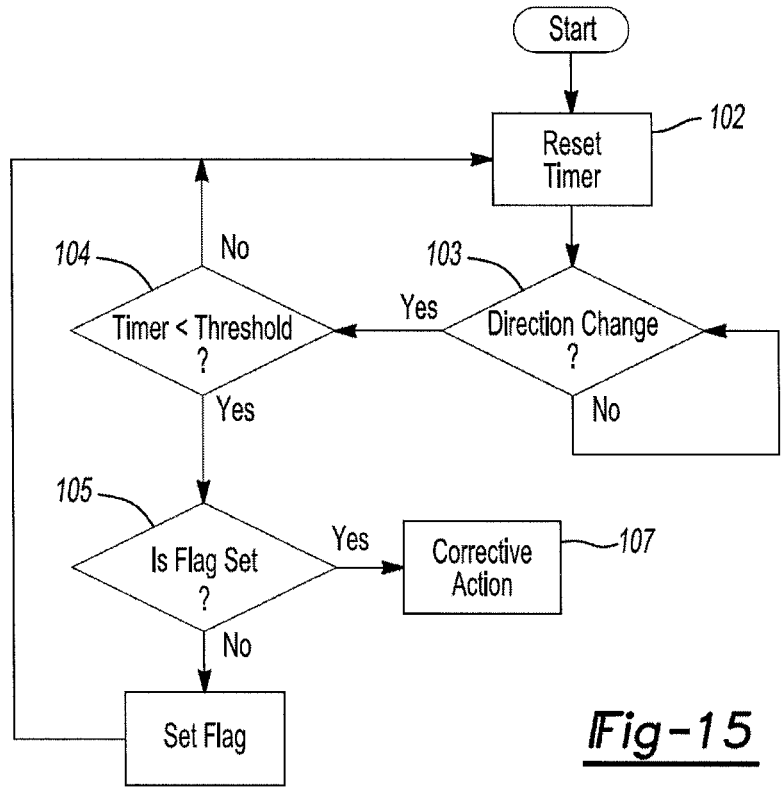
FIG. 15 is a flowchart of an exemplary method for preventing an oscillatory state in the power screwdriver.

FIG. 15 depicts an exemplary method of preventing such an oscillatory state in the screwdriver 10. For illustration purposes, the method works cooperatively with the control scheme described in relation to FIG. 8A. It is understood that the method can be adapted to work with other control schemes, including those set forth above. In an exemplary embodiment, the method is implemented by controller 24 in the tool.

Rotational direction of the output spindle is dictated by the angular displacement of the tool as discussed above. For example, a clockwise rotation of the tool results in clockwise rotation of the output member. However, the onset of an oscillatory state may be indicated when tool rotation occurs for less than a predetermined amount of time before being rotated in the opposing direction. Therefore, upon detecting rotation of the tool, a time is initiated at 102. The timer accrues the amount of time the output member has been rotating in a given direction. Rotational motion of the tool and its direction are continually being monitored as indicated at 103.

When the tool is rotated in the opposite direction, the method compares the value of the timer to a predefined threshold (e.g., 50 ms) at 104. If the value of the timer is less than the threshold, the onset of an oscillatory state may be occurring. In an exemplary embodiment, the oscillatory state is confirmed by detecting two oscillations although it may be presumed after a single oscillation. Thus, a flag is set at 105 to indicate the occurrence of a first oscillation. If the value of the timer exceeds the threshold, the change in rotational direction is presumed to be intended by the operator and thus the tool is not in an oscillating state. In either case, the timer value is reset and monitoring continues.

In an oscillatory state, the rotational direction of the tool will again change as detected at 103. In this scenario, the value of the timer is less than the threshold and the flag is set to indicate the preceding occurrence of the first oscillation. Accordingly, a corrective action may be initiated as indicated at 107. In an exemplary embodiment, the tool may be shut down for a short period of time (e.g., ¼ second), thereby enabling the user to regain control of the tool before operation is resumed. Other types of corrective actions are also contemplated by this disclosure. It is envisioned that the corrective action may be initiated after a single oscillation or some other specific number of oscillations exceeding two. Likewise, other techniques for detecting an oscillatory state fall within the broader aspects of this disclosure.

Figure 19A:
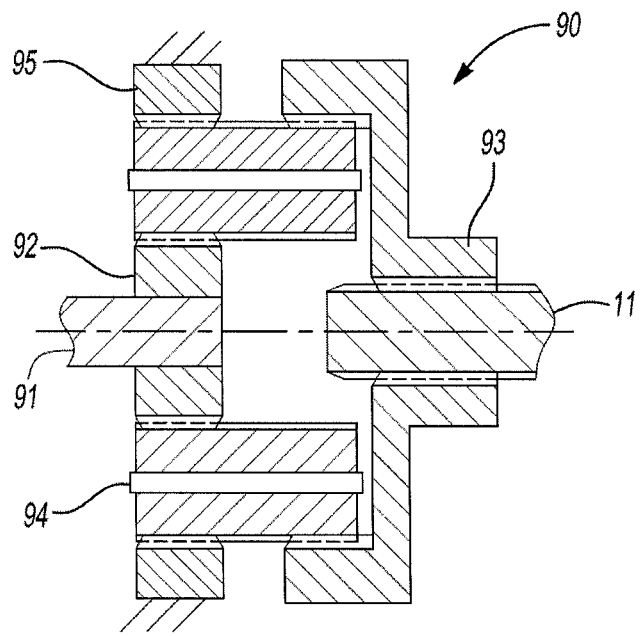
FIGS. 19A-19B are diagrams illustrating an exemplary self-locking planetary gear set.
Figure 19B:
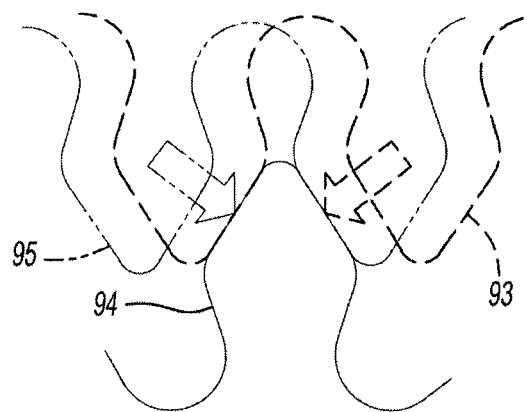

In another arrangement, the tool may be configured with self-locking planetary gear set 90 disposed between the output member 11 and a drive shaft 91 of the motor 26. The self-locking gear set could include any planetary gear set which limits the ability to drive the sun gear through the ring gear and/or limits the ability of the spindle to reverse. This limiting feature could be inherent in the planetary gear set or it could be some added feature such as a sprag clutch or a one way clutch. Referring to FIGS. 19A and 19B, one inherent method to limit the ability of a ring gear to back drive a sun gear 92 is to add an additional ring gear 93 as the output of the planetary gear set 94 and fix the first ring gear 95. By fixing the first ring gear 95, power is transferred through the sun gear 92 into the planetary gear set 94 into the second (unfixed, out) ring gear 93.

When torque is applied back through the output ring gear 93 into the planetary gear set 94, the internal gear teeth on the output ring gear are forced into engagement with the corresponding teeth on the planetary gear set 94. The teeth on the planetary gear set 94 are then forced into engagement with the corresponding teeth on the fixed ring gear. When this happens, the forces on the planetary gears' teeth are balanced by the forces acting through the output ring gear 93 and the equal and opposite forces acting through the fixed ring gear 95 as seen in FIG. 19B. When the forces are balanced, the planetary gear is fixed and does not move. This locks the planetary gear set and prevents torque from being applied to the sun gear. Other arrangements for the self-locking gear set are also contemplated by this disclosure.

The advantage of having a self-locking planetary gear set is that when the motor is bogged down at high torque levels during twisting operations such as, but not limited to, threaded fasteners, the tool operator can overcome the torque by twisting the tool. This extra torque applied to the application from the tool operator is counteracted by the forces within the self-locking planetary gear set, and the motor does not back drive. This allows the tool operator to apply additional torque to the application.

In this arrangement, when the sensed current exceeds some predefined threshold, the controller may be configured to drive the motor at some minimal level that allows for spindle rotation at no load. This avoids stressing the electronics in a stall condition but would allow for ratcheting at stall. The self-locking planetary gears would still allow the user to override stall torque manually. Conversely, when the user turns the tool in the reverse direction to wind up for the next forward turn, the spindle rotation would advance the bit locked in the screwhead, thereby counteracting the user's reverse tool rotation.

With reference to FIG. 20, a second exemplary power screwdriver is indicated generally by reference number 10'. This embodiment allows the user to hold the screwdriver 10' in the palm of the user's hand and actuate the trigger switch assembly 50' with the palm of the user's hand, most preferably the area of the palm that forms the base of the user's thumb. In this embodiment, the tool operator actuates the trigger switch assembly 50' to initiate tool operation. Given the orientation of the screwdriver 10' in the palm of the user's hand, it should be recognized that the trigger switch assembly 50' is actuated and remains depressed just by holding the screwdriver 10'. This allows for natural and intuitive use, where the user can simply hold the screwdriver 10' and turn it.

With reference to FIGS. 5A-5C and 20, the trigger switch assembly 50' is substantially similar to the trigger switch assembly 50. The trigger switch assembly 50' is comprised primarily of an elongated casing 52 that houses at least one momentary switch 53 and a biasing member 54, such as a spring. The elongated casing 52 is movably coupled to housing 200 in such a way that allows it to translate and/or pivot about any point of contact by the operator. For example, if the tool operator presses near the top or bottom of the elongated casing 52, the trigger switch assembly 50' pivots as shown in FIGS. 5A and 5B, respectively. If the tool operator presses near the middle of the elongated casing 52, the trigger switch assembly 50' is translated inward towards the tool body as shown in FIG. 5C. In any case, the force applied to the elongated casing 52 by the operator will depress at least one of the switches from an OFF position to an ON position. If there are two or more switches 53, the switches 53 are arranged electrically in parallel with each other (as shown in FIG. 7) such that only one of the switches needs to be actuated to power up the tool. When the operator releases the trigger, the biasing member 54 biases the elongated casing 52 away from the tool, thereby returning each of the switches to an OFF position. The elongated shape of the casing helps the operator to actuate the switch from different grip positions. It is envisioned that the trigger switch assembly 50' may be comprised of more than two switches 53 and/or more than one biasing member 54 as shown in FIGS. 6A-6.C. This embodiment otherwise functions as described for the previous embodiment.

With reference to FIG. 21, a third exemplary power screwdriver is indicated generally by reference number 10". In this embodiment, the tool operator actuates the trigger switch assembly 50" with the user's index finger to power up the screwdriver 10". The trigger switch assembly 50" functions as an ON/OFF switch. Once the user presses and releases the trigger switch assembly 50", the screwdriver 10" is in an ON state (i.e., the battery is connected to the controller and other electronic components). Rotational motion is detected and acted upon only when the tool is powered up. When the operator places the switch in an OFF position, the tool is powered down and is no longer operational. The screwdriver 10" remains in the ON state until the user turns it off by pressing and releasing the trigger switch assembly 50" again. It is also contemplated that the screwdriver 10" will automatically shut off after a period of inactivity, and the trigger switch assembly 50" may be implemented in other ways.

Output member 11 rotates around longitudinal axis 8' based on angular displacement as described above. In other words, the user rotates the screwdriver 10" to drive output member 11. In this third embodiment, a zero button 210 allows the user to reset the starting or reference point as previously described.

The tool may be further configured with a reaming tool 214 disposed between the second housing portion 14 and the output member 11. For example, a user may wish to refine a hole drilled using the tool or remove burrs from the cut end of a piece of conduit. This embodiment has two modes of operation: the motor 26 either drives the output member 11 or the reaming tool 214. In one arrangement, the mode is selected manually by the user as shown in FIGS. 22A-22B and described below. In another arrangement, the mode is selected by applying either the output member 11 or the reaming tool 214 to a workpiece in order to use screwdriver 10" as a screwdriver or a reamer, respectively, as shown in FIGS. 23A-23B and described below. Other means for selecting the mode of operation are also contemplated by this disclosure.

Other reaming tool variations are contemplated. In an alternative embodiment, the reaming tool would oscillate. For example, the user's wrist remains rotated clockwise, and the reaming tool rotates in a clockwise direction for a short time period, reverses direction for a short time period, repeating until operation is terminated. In another alternative embodiment, the reaming tool would have a pulse mode. If the drive signal is pulsed, a spike in the torque output might facilitate overcoming a burr. In still another alternative embodiment, the power tool could have multiple gears associated with it. At lower speeds, higher torque could be achieved while at higher speeds, lower torque would be sufficient for driving screws, for example.

FIGS. 22A-22B show an exemplary clutch mechanism for selectively engaging the reaming tool 214 (to operate screwdriver 10" as a reamer) or the output member 11 (to operate screwdriver 10" as a screwdriver). It is to be understood that the representation of the reaming tool 214 in FIGS. 22A-22B has been simplified from its depiction in FIG. 21 in order to more clearly convey the mode switching.

In this exemplary embodiment, the user rotates a collar 240 between two positions to select the mode of operation. It should be understood that this collar could also be implemented to translate between the two positions while remaining rotationally fixed. The collar 240 is attached to a grounding ring 228. When the grounding ring 228 is in the rearward position as shown in FIG. 22A, the grounding ring 228 engages a planet carrier 236 and prevents it from rotating. In this configuration, the motor drives the planets 237 to rotate about the pins of the planet carrier 236, causing the ring gear 232 to rotate. This drives the reaming tool 214 while the output member 11 remains fixed, and as such, screwdriver 10" operates as in reamer mode. When the grounding ring 228 is in the forward position as shown in FIG. 22B, the planet carrier 236 is free to rotate, and the ring gear 232 is fixed. In this configuration, the motor drives the planets 237 which in turn drives the output member 11, and as such, screwdriver 10" operates in screwdriver mode. It is envisioned that in an alternative embodiment, the ring gear 232 and the planet carrier 236 may be fixed to one another and free to rotate at the same time.

FIGS. 23A and 23B illustrate another exemplary clutch mechanism for selecting the mode of operation. In this embodiment, a dog type clutch 238 is used to selectively engage the reaming tool 214. It is to be understood that the representation of the reaming tool 214 in FIGS. 23A-23B has been simplified from its depiction in FIG. 21 in order to more clearly convey the mode switching.

In this arrangement, screwdriver 10" operates as a screwdriver as shown in FIG. 23A unless the user applies the reaming tool 214 to a workpiece 230. If no force is applied to the reaming tool, the dog clutch 238 is not engaged, and the output member 11 is free to rotate. To operate screwdriver 10" as a reamer, the user applies the reaming tool 214 to a workpiece 230. This bias load applies a force to the compression springs 234, as shown in FIG. 23B. This engages the dog clutch 238, which causes the reaming tool 214 to rotate with the output member 11. This embodiment otherwise functions the same as the other embodiments discussed above.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

What is claimed is:

1. A method for operating a power tool having an output member, comprising:
   receiving a user input in the form of a rotational motion of the power tool about an axis in a desired rotational direction;
   monitoring rotational motion of the power tool about the axis using a rotational motion sensor disposed in the power tool, the axis aligned substantially in parallel with a longitudinal axis of the output member;
   determining a direction of the rotational motion about the axis; and
   driving the output member in a direction defined by the detected rotational motion of the tool, where the output member is driven by a motor residing in the power tool.

2. The method of claim 1 further comprises determining angular displacement of the tool about the axis in relation to a reference position and driving the output member at a rotational speed that correlates to the angular displacement of the tool from the reference position.

3. The method of claim 2 further comprises:
   determining angular velocity of the tool about the axis using input from the rotational motion sensor;
   selecting one of a plurality of control profiles based on the angular velocity of the tool, where a control profile correlates the angular displacement of the tool to the rotational speed at which to drive the output member; and
   driving the output member at a rotational speed in accordance with the selected control profile.

4. The method of claim 1 further comprises determining angular displacement of the tool about the axis in relation to a reference position and driving the output member at a rotational speed when the angular displacement of the tool from the reference position exceeds a displacement threshold.

5. The method of claim 4 further comprises resetting the reference position to zero in response to an input command from an operator of the tool.

6. The method of claim 4 further comprises driving the output member at a maximum rotational speed when the angular displacement of the tool exceeds a first threshold and driving the output member at a designated rotational speed that is less than the maximum rotational speed when the angular displacement of the tool is less than the first threshold but greater than a second threshold.

7. The method of claim 1 further comprises driving the output member in the same direction as the rotational motion of the tool about the axis.

8. The method of claim 1 further comprises determining when the output member of the tool engages a workpiece and driving the output member in response to rotational motion only while the tool is engaged with the workpiece.

9. The method of claim 1 further comprises determining when an operator is grasping the tool and driving the output member in response to rotational motion only while the operator is grasping the tool.

10. A power tool comprising:
    a housing;
    an output member at least partially contained in the housing and configured to rotate about a longitudinal axis;
    a motor contained in the housing and drivably connected to the output member to impart rotary motion thereto;
    a rotational motion sensor arranged in the housing and operable to detect rotational motion of the housing about the longitudinal axis of the output member;
    a controller configured in the housing to receive a signal indicative of rotational motion from the rotational motion sensor, the controller operable to determine a direction of the rotation motion of the housing about the axis and drive the motor in the same direction as the rotational motion of the housing;
    wherein the controller drives the motor in a clockwise motion about the axis when the rotational motion of the housing about the axis is clockwise and drives the motor in a counter-clockwise motion about the axis when the rotational motion of the housing about the axis is counter-clockwise.

11. The power tool of claim 10 wherein the controller determines angular displacement of the tool about the longitudinal axis in relation to a reference position and drives the motor at a rotational speed that correlates to the angular displacement of the tool.

12. The power tool of claim 11 wherein the controller resets the reference position to zero in response to an input command from an operator of the tool.

13. The power tool of claim 10 wherein the controller determines angular displacement of the tool about the longitudinal axis in relation to a reference position and drives the motor at a rotational speed when the angular displacement exceeds a displacement threshold.

14. The power tool of claim 10 wherein the controller drives the motor at a maximum rotational speed when the angular displacement of the tool exceeds a first threshold and drives the motor at a designated rotational speed that is less than the maximum rotational speed when the angular displacement of the tool is less than the first threshold but greater than a second threshold.

15. The power tool of claim 10 wherein the controller determines when the output member of the tool engages a workpiece and drives the motor in response to rotational motion only while the tool is engaged with the workpiece.

16. The power tool of claim 10 wherein the controller determines when an operator is grasping the tool and drives the motor in response to rotational motion only while the operator is grasping the tool.

17. The power tool of claim 10 further comprises means for locking the output member in fixed relation to the housing when current being delivered to the motor exceeds a predefined threshold.

18. The power tool of claim 10 wherein the controller determines the rotational motion of the housing to be stationary, determines an error in the signal from the rotational motion sensor while the rotational motion of the housing is stationary and calibrate the rotational motion sensor using the error.

19. A power tool comprising:
    a housing;
    a motor contained in the housing;
    an output member configured at least partially in the housing to rotate about a longitudinal axis and selectively connectable to the motor to impart rotary motion thereto;
    a reamer tool configured at least partially in the housing to rotate about the axis and selectively connectable to the motor to impart rotary motion thereto;
    a rotational motion sensor arranged in the housing at a location spatially separated from the output member and operable to detect rotational motion of the housing about the longitudinal axis of the output member; and
    a controller configured in the housing to receive a signal indicative of rotational motion from the rotational motion sensor, the controller operable to determine a direction of the rotation motion of the housing about the axis and drive the motor in a clockwise motion about the axis when the rotational motion of the housing about the axis is clockwise and drives the motor in a counter-clockwise motion about the axis when the rotational motion of the housing about the axis is counter-clockwise.

* * * * *

UNITED STATES PATENT AND TRADEMARK OFFICE
Certificate

Patent No. 8,418,778 B2

Patented: April 16, 2013

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Scott Eshleman, Parkville, MD (US); Craig Schell, Street, MD (US); Andrew E. Seman, Pylesville, MD (US); Daniel Puzio, Baltimore, MD (US); Daniele C. Brotto, Baltimore, MD (US); Joseph P. Kelleher, Parkville, MD (US); and James B. Watson, Baltimore, MD (US).

Signed and Sealed this Third Day of September 2013.

M. ALEXANDRA ELVE
*Supervisory Patent Examiner*
Art Unit 3721
Technology Center 3700